US010647143B2

(12) United States Patent
Weihs et al.

(10) Patent No.: US 10,647,143 B2
(45) Date of Patent: *May 12, 2020

(54) CALCIUM CARBONATE FOR ROTOGRAVURE PRINTING MEDIUM

(71) Applicant: Omya International AG, Oftringen (CH)

(72) Inventors: Jan Philipp Weihs, Düdingen (CH); Patrick A. C. Gane, Rothrist (CH); Johannes Kritzinger, Olten (CH); Tazio Fornera, Zofingen (CH); Ola Lindstrøm, Malmö (SE); Alain Cremaschi, Saint Germain la Ville (FR); Wolfgang Höpfl, Schwörstadt (DE); Rolf Endre Orten, Molde (NO)

(73) Assignee: Omya International AG, Oftringen (CH)

( * ) Notice: Subject to any disclaimer, the term of this patent is extended or adjusted under 35 U.S.C. 154(b) by 0 days.

This patent is subject to a terminal disclaimer.

(21) Appl. No.: 16/017,336

(22) Filed: Jun. 25, 2018

(65) Prior Publication Data

US 2018/0319193 A1 Nov. 8, 2018

Related U.S. Application Data

(63) Continuation-in-part of application No. 15/309,263, filed as application No. PCT/EP2015/059846 on May 5, 2015, now abandoned, application No. 16/017,336, which is a continuation-in-part of application No. 15/308,723, filed as application No. PCT/EP2015/061229 on May 21, 2015, now Pat. No. 10,053,581.

(60) Provisional application No. 62/018,772, filed on Jun. 30, 2014.

(30) Foreign Application Priority Data

May 26, 2014 (EP) .................................. 14169915
May 26, 2014 (EP) .................................. 14169923

(51) Int. Cl.
C09D 7/43 (2018.01)
C09D 7/61 (2018.01)
C09D 7/63 (2018.01)
C09D 133/04 (2006.01)
C09D 133/08 (2006.01)
C09D 7/41 (2018.01)
C08K 3/26 (2006.01)
C08K 5/098 (2006.01)
D21H 19/58 (2006.01)
D21H 19/64 (2006.01)
D21H 19/38 (2006.01)
D21H 19/60 (2006.01)
B41M 5/52 (2006.01)
B41M 5/50 (2006.01)

(52) U.S. Cl.
CPC ............ *B41M 5/5245* (2013.01); *B41M 5/52* (2013.01); *C09D 7/43* (2018.01); *C09D 7/61* (2018.01); *C09D 7/63* (2018.01); *C09D 133/04* (2013.01); *C09D 133/08* (2013.01); *D21H 19/385* (2013.01); *D21H 19/58* (2013.01); *D21H 19/60* (2013.01); *D21H 19/64* (2013.01); *B41M 5/508* (2013.01); *B41M 5/5218* (2013.01); *B41M 5/5236* (2013.01); *B41M 5/5254* (2013.01); *B41M 2205/34* (2013.01); *C08K 5/098* (2013.01); *C08K 2003/265* (2013.01); *C08K 2201/005* (2013.01); *C08K 2201/006* (2013.01); *C09D 7/41* (2018.01)

(58) Field of Classification Search
None
See application file for complete search history.

(56) References Cited

U.S. PATENT DOCUMENTS

| | | | |
|---|---|---|---|
| 4,298,652 A | 11/1981 | Suzuki et al. | |
| 4,367,171 A | 1/1983 | Leifels et al. | |
| 4,725,318 A | 2/1988 | Minayoshi et al. | |
| 5,120,365 A | 6/1992 | Kogler | |
| 5,278,248 A | 1/1994 | Egraz et al. | |
| 5,420,190 A | 5/1995 | Gane | |
| 5,439,558 A | 8/1995 | Bergmann et al. | |
| 5,533,678 A | 7/1996 | Strauch et al. | |
| 5,605,568 A | 2/1997 | Naydowski et al. | |
| 5,731,034 A | 3/1998 | Husband | |
| 5,861,209 A | 1/1999 | Haskins et al. | |
| 5,879,512 A | 3/1999 | McGenity et al. | |

(Continued)

FOREIGN PATENT DOCUMENTS

| | | |
|---|---|---|
| DE | 19529661 | 4/1997 |
| EP | 0179597 | 2/1993 |

(Continued)

OTHER PUBLICATIONS

Labface Sancroft Way, "Particle Size Measurement with the SediGraph III 5120 from Micromeritics," https://labface.com/suppliers/particle-size-68, Oct. 19, 2011.

(Continued)

*Primary Examiner* — Joshua D Zimmerman
(74) *Attorney, Agent, or Firm* — Heslin Rothenberg Farley & Mesiti, P.C.

(57) ABSTRACT

The present invention relates to the field of rotogravure printing, and more specifically to a rotogravure printing medium, a coating composition for rotogravure printing media, a method for producing such a rotogravure printing medium and an use of the rotogravure printing medium in a printing application, preferably in rotogravure printing using electrostatic assist (ESA).

33 Claims, 4 Drawing Sheets

(56) References Cited

U.S. PATENT DOCUMENTS

| | | | |
|---|---|---|---|
| 5,959,124 | A | 9/1999 | Hashiba et al. |
| 5,996,489 | A | 12/1999 | Leube et al. |
| 8,002,887 | B2 | 8/2011 | Rainer et al. |
| 8,517,291 | B2 | 8/2013 | Rainer et al. |
| 9,580,605 | B2 | 2/2017 | Wimmer et al. |
| 10,053,581 | B2 | 8/2018 | Fornera et al. |
| 2006/0100329 | A1 | 5/2006 | Fumagalli et al. |
| 2010/0095869 | A1 | 4/2010 | Dupont et al. |
| 2011/0269887 | A1 | 11/2011 | Gane et al. |
| 2011/0297043 | A1 | 12/2011 | Gane et al. |
| 2013/0174994 | A1 | 7/2013 | Buri et al. |

FOREIGN PATENT DOCUMENTS

| | | |
|---|---|---|
| EP | 0607840 A1 | 7/1994 |
| EP | 0332102 | 9/1994 |
| EP | 0850880 A1 | 7/1998 |
| EP | 0960913 | 8/2004 |
| EP | 0582466 | 10/2004 |
| EP | 2014830 | 1/2009 |
| EP | 2194103 A1 | 6/2010 |
| EP | 2524898 A1 | 11/2012 |
| EP | 2546410 A1 | 1/2013 |
| EP | 2379648 B1 | 6/2013 |
| EP | 2641941 A1 | 9/2013 |
| EP | 2684999 | 12/2014 |
| EP | 2949477 | 11/2016 |
| GB | 2139606 A | 11/1984 |
| JP | S62263238 A | 11/1987 |
| JP | 2004008959 A | 1/2004 |
| WO | 1992022016 | 12/1992 |
| WO | 9851860 A1 | 11/1998 |
| WO | 2000066510 | 11/2000 |
| WO | 2004005616 A2 | 1/2004 |
| WO | 2004016566 A1 | 2/2004 |
| WO | 2005111153 | 11/2005 |
| WO | 2008122617 | 10/2008 |
| WO | 2009009553 A1 | 1/2009 |
| WO | 2009146416 | 12/2009 |
| WO | 2010070002 A1 | 6/2010 |
| WO | 2010098821 A2 | 9/2010 |
| WO | 2013030178 A1 | 3/2013 |
| WO | 2013061068 A1 | 5/2013 |
| WO | 2013167420 A1 | 11/2013 |
| WO | 2014001063 A1 | 1/2014 |
| WO | 2014044778 A1 | 3/2014 |

OTHER PUBLICATIONS

Internet Archive, "Particle Size Measurement with the SediGraph III 5120 from Micromeritics," https://web.archive.org/web/20111019055340/https://labface.com/suppliers/particle-size-68, Oct. 19, 2011.

"Methods of Moisture Content Determination, Halogen Moisture Analyzer from Mettler Toledo," Application Brochure, Feb. 2002.

"Operating Instructions—HR73 and HG53 Moisture Analyzers, HR73-P and HG53-P Moisture Analyzers," 2001.

Ahn, J.V. et al., "Comparison of Oven-Drying Methods for Determination of Moisture Content in Feed Ingredients," Asian Australas. J. Anim. Sci., vol. 27, No. 11, Nov. 2014, pp. 1615-1622.

Calcit d.o.o. catalogue disclosing calcium carbonate-containing products, Feb. 2010, 8 pages.

MatWeb, LLC, "Omya Hydrocarb® 90 HS Calcium Carbonate," http://www.matweb.com/search/datasheet.aspx?matguid=d61fcf42cbd04ebd87468a3ad02186ba, Nov. 3, 2012.

Internet Archive, "Omya Hydrocarb® 90 HS Calcium Carbonate," https://web.archive.org/web/20121103181904/http://matweb.com/search/GetMatlsByManufacturer.aspx?navletter=0&manID=579&manname=0mya+North+America, Nov. 3, 2012.

Metso Product Catalogue, "Tube Press—Mechanical Dewatering by Pressure," 2011, pp. 1-8.

Notice of Opposition to a European Patent dated Dec. 1, 2017 filed by Schaefer Kalk GmbH & Co. KG for European Patent No. EP 2949707.

Lückert, "Pigment + Füllstoff Tabellen," 6th Edition, Vincentz Verlag, Hannover, 2002, pp. 12-25, 730-733, 738-741, and 760-763.

Specialty Minerals, "Opacarb® A60—Performance Minerals for Paper," Technical Data, datasheet, 2003.

Schaefer Kalk, "Schaefer Precarb® 100," Technical Data Sheet, Apr. 2012.

Schaefer Kalk, "Schaefer Precarb® 110," Technical Data Sheet, Apr. 2012.

Schaefer Kalk, "Schaefer Precarb® 120," Technical Data Sheet, Apr. 2012.

Schaefer Kalk, "Schaefer Precarb® 400," Technical Data Sheet, Apr. 2012.

Müller et al., "Formulierung von Kleb- und Dichtstoffen—Coatings Compendien," Vincentz Network, Hannover, 2004, pp. 243-246 and 276-279.

Response to the Communication of Notices of Opposition filed in the European Patent Office by Omya International AG on May 17, 2018 for European Patent No. EP 2949707.

Omya Product Information, "Hydrocarb® 60—GU 78%," Technical Data Sheet, Version 7, Edition Aug. 18, 2010.

Omya Product Information, "Hydrocarb® 60—OG 78%," Technical Data Sheet, Version 8, Edition Jul. 2, 2009.

Omya Product Information, "Hydrocarb® 60—ME 78%," Technical Data Sheet, Version 5, Edition Jan. 12, 2011.

Definitions of "slurry," https://www.wordnik.com/words/slurry, May 23, 2018, 1 page.

Definitions of "crumble," https://www.wordnik.com/words/crumble, May 23, 2018, 1 page.

The International Search Report dated Aug. 24, 2015 for PCT/EP2015/061229.

The Written Opinion of International Searching Authority dated Aug. 24, 2015 for PCT/EP2015/061229.

Notice of Acceptance for Patent Application dated May 10, 2017 for Australian Application No. 2015266175.

Office Action dated Dec. 11, 2017 for Canadian Application No. 2,948,431.

Office Action dated Jan. 31, 2018 for Chilean Application No. 2016-3042.

Office Action dated Jun. 20, 2017 for Chinese Application No. 201580027549.2.

Office Action dated Apr. 5, 2017 for Colombian Application No. NC2016/0004262.

Search Report dated Nov. 20, 2014 for European Application No. 14169923.1.

Office Action dated Jan. 9, 2018 for Japanese Application No. 2016-569641.

Office Action dated Feb. 1, 2018 for Korean Application No. 102016-7036333.

Office Action dated Oct. 12, 2017 for Mexican Application No. MX/a/2016/015412.

Decision to Grant a Patent for Invention dated Jan. 12, 2018 for Russian Application No. 2016149095/05.

Search Report dated Jan. 12, 2018 for Russian Application No. 2016149095/05.

Examination Report dated Jul. 4, 2017 for Singapore Application No. 11201609606P.

Examination Report dated Jul. 5, 2016 for Taiwanese Application No. 104116020.

The International Search Report dated Jul. 24, 2015 for PCT/EP2015/059846.

The Written Opinion of International Searching Authority dated Jul. 24, 2015 for PCT/EP2015/059846.

Notice of Acceptance for Patent Application dated Jul. 24, 2017 in connection with Australian Patent Application No. 2015266246, 3 pages.

Examination report No. 1 for standard patent application dated May 26, 2017 in connection with Australian Patent Application No. 2015266246, 3 pages.

(56) References Cited

OTHER PUBLICATIONS

Communication European Search Report dated Aug. 13, 2014 in connection with European Patent Application No. 14169915.7, 9 pages.
Korean Office Action dated Aug. 10, 2017 in connection with Korean Patent Application No. 10-2016-7035122, 6 pages.
Taiwan Office Action with Search Report dated Aug. 4, 2016 in connection with Taiwan Patent Application No. 104114706, 6 pages.
PCT Notification Concerning Transmittal of International Preliminary Report on Patentability dated Dec. 8, 2016 in connection with PCT International Patent Application No. PCT/EP2015/059846, 11 pages.
Ombrelub CD, Technical Information, Lubricant and friction agent for paper coatings, dated Mar. 2014, Münzing Creating Additive Value, Münzing Chemie GmbH, 1 page.
Die Elektrostatische Druckhilfe wird Ihnen präsentiert von: Rudiger Schnick, presentation, 18 pages.
Calcium Carbonat Von der Kreidezeit ins 21. Jahrhundert, Bikhäuser, 2001, ISBN 3-7643-6424-6, 38 pages.
Ornya Papier Handbuch, 2001, 32 pages.
Submission to Opposition to Kabel Premium Pulp & Paper GmbH dated Aug. 23, 2017 in connection with European Patent No. 2 949 477 B1, 24 pages.
Request for Opposition Kabel Premium Pulp & Paper GmbH dated Nov. 30, 2016 in connection with European Patent No. 2 949 477, 8 pages.
Communication of a notice of opposition dated Aug. 28, 2017 in connection with European Patent No. 2 949 477, 1 page.
Notice of opposition to a European Patent dated Nov. 30, 2016 in connection with European Patent No. 2 949 477, 8 pages.
Communication of a notice of opposition dated Aug. 25, 2017 in connection with European Patent No. 2 949 477, 1 page.
Submission to Opposition against European Patent No. 2 949 477 dated Aug. 18, 2017 in connection with European Patent No. 2 949 477, 40 pages.
Operating instructions HR73 and HG53 Moisture Analyzers HR73_p and HG53-P Moisture Analyzers, Mettler Toledo, https://www.mt.com/dam/mt_ext_files/Editorial/Generic/4/HR_HG_2_0x000010083e71a4d3400031bf_files/hr-hg_ba_en.pdf, 100 pages.
CalCarb™ R2, Mississippi Lime, Ed. Sep. 2006, 1 page.
Vicron Good Grade FCC, Fine Ground Limestones, Specialty Minerals Inc., Rev. Mar. 2007, 2 pages.
Fillers Coating Pigments for the paper industry, Calcit, 8 pages.
Calcit products, Calcit, 27 pages.
Ahn J Y et al, entitled "Comparison of Oven-drying Methods for Determination of Moisture Content in Feed Ingredients," Asian Australas. J. Anim. Sci., vol. 27, No. 11: 1615-1622.
Limestone, Geology rocks & minerals, 1 page.
Ground Calcium Carbonate (GCC), Mini-Encyclopedia of Papermaking Wet-End Chemistry, 1 page.
Application Brochure, Methods of moisture content determination, Halogen Moisture Analyzer from Mettler Toledo, 35 pages.
Calcium Carbonate, Omya, 201 pages.
7th Edition, Industrial Minerals & Rocks, Commodities, Markets, and Uses, ISBN-13: 978-0-87335-233-8, ISBN-10:87335-233-5, 5 pages.
Notice of Opposition to a European Patent dated Nov. 28, 2017 filed by Calcit d.o.o. for European Patent No. EP 2949707.
Affidavit made by Aleš Mujdrica dated Nov. 16, 2017 for European Patent No. EP 2949707.
Affidavit made by Mojca Opresnik dated Nov. 24, 2017 for European Patent No. EP 2949707.
Omya International AG catalogue, "Calcium Carbonate in the Paper Industry," Dec. 2004, 200 pages.
Screenshot of webpage: https://flexiblelearning.auckland.ac.nz/rocks_minerals/rocks/limestone.html.
An extract from Internet archive site ("https://web.archive.org") attesting to the availability of https://flexiblelearning.auckland.ac.nz/rocks_minerals/rocks/limestone.html, Apr. 2008.
Screenshot webpage: http://www4.ncsu.edu/~hubbe/GCC.htm which now redirects to https://projects.ncsu.edu/project/hubbepaperchem/GCC.htm, 2005.
An extract from internet archive site ("https://web.archive.org") attesting to the availability of http://www4.ncsu.edu/~hubbe/GCC.htm which now redirects to https://projects.ncsu.edu/project/hubbepaperchem/GCC.htm, Jan. 2002.

CALCIUM CARBONATE FOR ROTOGRAVURE PRINTING MEDIUM

CROSS-REFERENCE TO RELATED APPLICATIONS

This is a continuation-in-part of U.S. application Ser. No. 15/309,263, filed Nov. 7, 2016, which is a U.S. National Phase of PCT/EP2015/059846, filed May 5, 2015, which claims priority to European Application No. 14169915.7, filed May 26, 2014, and is a continuation-in-part of U.S. application Ser. No. 15/308,723, filed Nov. 3, 2016, which is a U.S. National Phase of PCT/EP2015/061229, filed May 21, 2015, which claims priority to U.S. Provisional Application No. 62/018,772, filed Jun. 30, 2014, and European Application No. 14169923.1, filed May 26, 2014, the contents of which are hereby incorporated by reference.

The present invention relates to the field of rotogravure printing, and more specifically to a rotogravure printing medium, a coating composition for a rotogravure printing medium, a method for producing such a rotogravure printing medium and an use of the rotogravure printing medium in a printing application, preferably in rotogravure printing using electrostatic assist (ESA).

Rotogravure is a printing technique which involves the contacting of a rotating cylinder with the paper surface under an applied pressure within a printing nip. The printed image is constituted from an array of engraved (gravure) cells formed in the cylinder surface either in respect to cell size (amplitude modulated) or cell frequency (frequency modulated). Each cell carries a doctored amount of volatile ink. The successful transfer of ink onto the paper surface depends on a number of factors such as the intimate contact between the cylinder and the paper surface, the contact of the ink meniscus with the paper surface, the wettability of the paper surface by the ink or the control of spreading of ink over the paper surface versus absorption of ink into the pore structure. In order to enhance the contact of the ink meniscus with the paper surface, typically an electric field is employed acting across the partial dielectric structure offered by the printing cylinder itself, the paper as medium and the backing roll surface. The effect of this is to attract and empty the gravure cell of ink, and thus promoting the minimisation of failure of transfer of ink dots from the printing cylinder to the paper surface.

Failure or disturbance of any of these mechanisms leads to the phenomenon of missing dots or partially formed dots, such that the quality of the image rapidly deteriorates, being observed either as a speckle effect or more subtly as a variation of print density or mottle.

Currently, coating compositions for rotogravure printing media are typically prepared by using talc, kaolin and/or clay as pigment materials. For example, U.S. Pat. No. 5,420,190 A refers to a paper coating composition for use in preparing a coated paper for gravure printing, which composition comprises a suspension in water of 100 parts by weight, on a dry weight basis, of a pigment or mixture of pigments having a particle size distribution such that at least 75% by weight of the particles have an equivalent spherical diameter smaller than 2 µm, and a latex the particles of which do not swell appreciably in water and which have an average size less than 0.2 µm, the latex being employed in an amount such as to provide from 3 to 15 parts by weight latex solids and the composition being substantially free from any viscosifying, film-forming hydrophilic polymeric material. The pigment is preferably kaolin. U.S. Pat. No. 5,959,124 A refers to a rotogravure or flexographic printing ink composition, comprising (A) an ink comprising a pigment dispersed in a fluid vehicle, said vehicle comprising resin incorporated into an aqueous or non-aqueous solvent or a mixture of such solvents; and (B) a wear reducing amount of a metal dihydrocarbyl dithiophosphate. U.S. Pat. No. 5,996,489. A relates to a method of printing paper by gravure printing, wherein the paper used is coated with a paper-coating slip containing a binding agent having a butadiene content of at least 74 wt %, based on the binding agent. The pigment is preferably clay. U.S. Pat. No. 5,439,558 A relates to a print substrate, in particular paper, having a coat on one or both sides, which contains ungelatinized starch granules and kaolin as coating pigment and possibly one or more additional mineral pigments and binder and wherein the content of the starch granules is 2 to 25% by weight with respect to the total coating pigment. U.S. Pat. No. 5,879,512 A refers to a method of producing a composition for coating fibrous sheet products which includes adding a surface treatment agent in an aqueous emulsion or solution form to an aqueous suspension of a dispersed inorganic particulate material comprising kaolin.

However, the use of talc, kaolin and/or clay in coating compositions improves the printability of the rotogravure printing medium but due to its hydrophobic behavior a worsen wetting of the coated paper surface for polar ink dispersions is observed resulting in worsen rheological characteristics of the ink during its application. Furthermore, talc has a grayish color, and, thus, reduces the brightness of the rotogravure paper.

However, rotogravure printing media are receiving strong competition from supercalendered grades. The latter uncoated papers have been progressively increasing in brightness, primarily by the increased use of calcium carbonate pigments. To maintain market share, the coated rotogravure printing media will soon have to follow suit and become brighter. This adds a further surface chemistry-induced problem, as calcium carbonate, an accepted material for brightness increase, is typically dispersed in the coating composition by using highly anionic dispersant resulting in a highly electrically polarisable coating layer. For example, U.S. Pat. No. 4,298,652 refers to a method of producing medium-grade coated paper for rotogravure printing. The method comprises applying the following coating composition (A) or (B) to either surface or both surfaces of base paper, wherein the coating composition (A) comprises pigments containing natural ground calcium carbonate with a specific surface area of 1.5 to 2.5 $m^2/g$ in a proportion of 5 to (95S-137.5)% by weight ("S" represents a specific surface area ($m^2/g$) of natural ground calcium carbonate), and adhesive of either alkali-sensitive synthetic resin emulsion or a mixture of alkali-nonsensitive synthetic resin emulsion and viscosity increasing agent(s) or the coating composition (B) comprises pigments containing natural ground calcium carbonate with a specific surface area of 2.5 to 5 $m^2/g$ in a proportion of 5 to 100% by weight, and adhesive of either alkali-sensitive synthetic resin emulsion or a mixture of alkali-nonsensitive synthetic resin emulsion and viscosity increasing agent(s). US 2006/0100329 A1 refers to paper coating formulations for rotogravure printing processes containing: a. 100 parts by weight of finely divided pigments; b. from 0.001 to 5 parts by weight of one or more substances selected from the group consisting of: mono-alkylsulfosuccinate; dialkylsulfosuccinates; sulfosuccinic acid mono-esters of ethoxylated and/or propoxylated fatty alcohols; sulfosuccinic acid di-esters of ethoxylated and/or propoxylated fatty alcohols; c. from 3 to 15 parts by weight of a polymeric acrylic binder, d. from 0.005 to 0.4 parts by weight of a dispersant. A mixture of finely divided pigments preferably contains at least 30% by weight of kaolin for rotogravue printing having from 40 to 70% of the particles finer than 2 μm. U.S. Pat. No. 5,861,209 A refers to a composition comprising a coated paper with a pigment, said pigment comprises aragonitic precipitated calcium carbonate particles having an aspect ratio of from about 3:1 to about 15:1 and a multimodal particle size distribution. U.S. Pat. No. 5,605,568 A refers to a $CaCO_3$-talc coating pigment slurry consists of the following four co-ground components: a. 24 to 64% by weight $CaCO_3$, b. 5 to 48% by weight talc, c. 20 to 40% by weight $H_2O$, and d. an adjuvant combination consisting of 0.05 to 1.4% by weight of at least one commercially available grinding acid and 0.05 to 1.2% by weight of at least one commercially available dispersing agent, wherein the mixed pigments have an average statistical particle diameter of 0.4 μm to 1.5 μm. EP2641941 refers to an aqueous calcium carbonate containing composition comprising a) a calcium carbonate containing material in an amount of at least 10 wt.-%, based on the total dry weight of the composition, b) at least one anionically charged comb polymer having a specific charge of −5 to −500 C/g at pH 8, c) optionally at least one binding agent in an amount of at least 2.5 wt.-%, based on the total dry weight of the composition, and d) at least one salt of a divalent or trivalent cation in an amount of between 1 and 20 wt.-%, based on the total dry weight of the composition, whereby at least 95 wt.-% of the total amount of salt is dissolved within the composition, and wherein the composition has a Brookfield viscosity of below 2500 mPa·s at 20° C.

However, uneven polarisation of the coating layer due to the use of highly charged pigment and uneven coating weight distribution leads to an observed mottling and lack of image definition and colour rendering. For this reason electrostatically charged dispersed calcium carbonate displays a disadvantage compared to clay, kaolin and/or talc particles where the particle surface is essentially free of charged dispersant. Consequently, calcium carbonate is generally considered unsuitable for a coating layer of a rotogravure printing medium except in limited amounts in the coating formulation.

Therefore, there is a continuous need in the art for a rotogravure printing medium which can be used with satisfactory coating runnability and which has improved optical and mechanical characteristics. In particular, it is desirable to decrease the amount of missing dots or partially formed dots while the brightness, opacity, light scattering and roughness are maintained or even improved.

Accordingly, it is an object of the present invention to provide a printing medium that is suitable for rotogravure printing and significantly reduces the problems of the prior art. A further objective is to provide a rotogravure printing medium showing a satisfactory coating runnability. Another objective of the present invention is to provide a rotogravure printing medium having similar or improved optical and mechanical characteristics, especially a decreased amount of missing dots or partially formed dots at maintained or improved brightness and opacity and light scattering. An even further objective of the present invention is to provide a rotogravure printing medium having maintained or improved roughness.

The foregoing and other objectives are solved by the subject-matter as defined herein in claim 1.

DETAILED DESCRIPTION

Figure 1:
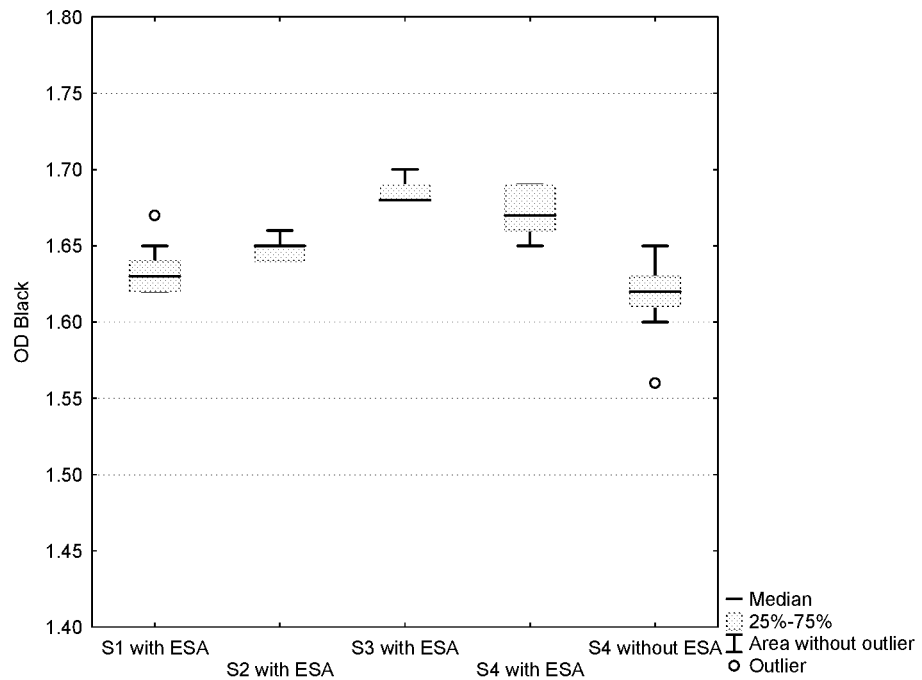
FIG. 1: The effect of coating composition 1 to 4 on the optical density of black of calendered coated paper.
Figure 2:
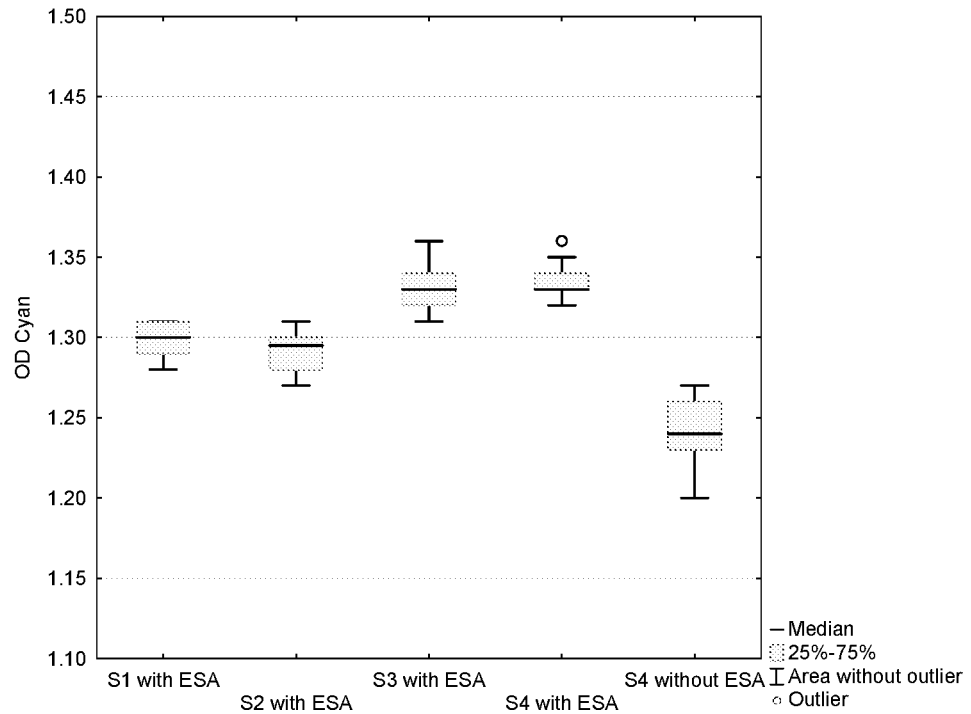
FIG. 2: The effect of coating composition 1 to 4 on the optical density of cyan of calendered coated paper.
Figure 3:
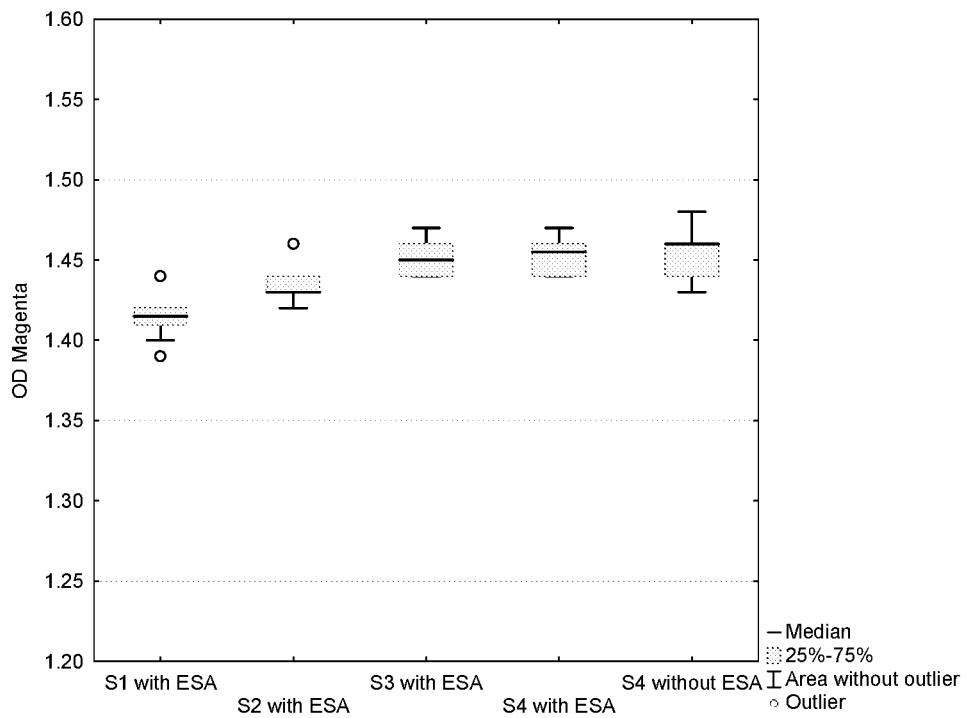
FIG. 3: The effect of coating composition 1 to 4 on the optical density of magenta of calendered coated paper.
Figure 4:
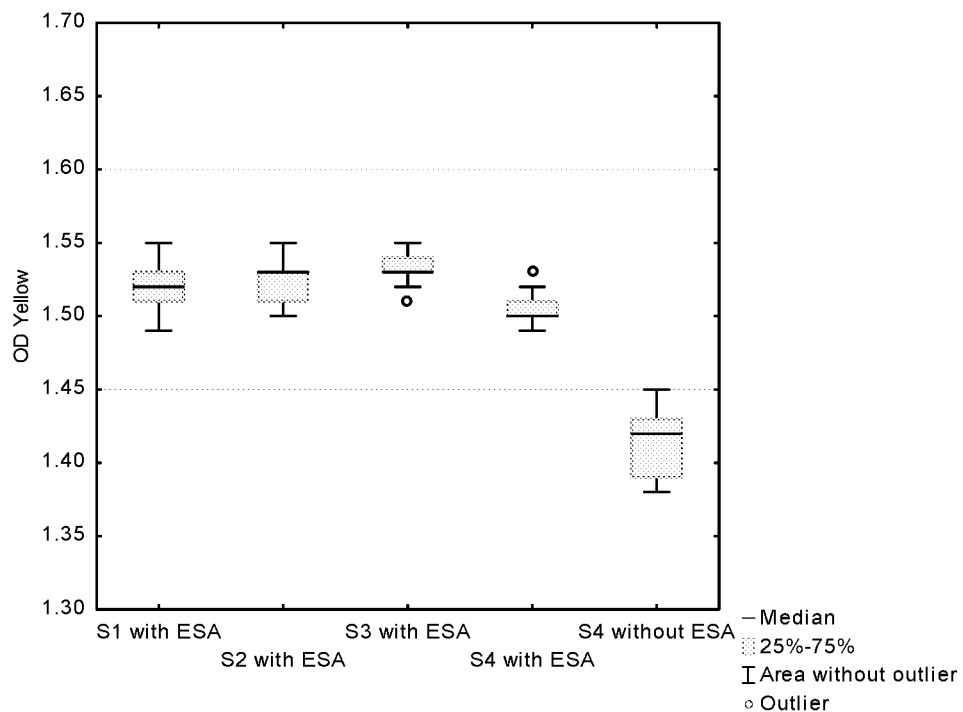
FIG. 4: The effect of coating composition 1 to 4 on the optical density of yellow of calendered coated paper.

According to one aspect of the present application a rotogravure printing medium is provided. The rotogravure printing medium comprising
  a) a substrate having a first side and a reverse side, and
  b) a coating layer being in contact with at least the first side of the substrate, wherein the coating layer consists of
    i) >50.0 to 100.0 parts by weight of at least one natural source of calcium carbonate, the at least one natural source of calcium carbonate comprises particles having a BET specific surface area of from 4.0 to 12.0 $m^2/g$, measured by the BET nitrogen method,
    ii) 0.0 to ≤50.0 parts by weight of at least one further pigment suitable for papermaking,
    iii) 3.0 to 6.0 parts by weight of at least one synthetic binder,
    iv) 0.1 to 0.5 parts by weight of at least one stearate salt,
    v) optionally 1.0 to 1.5 parts by weight of at least one polysaccharide,
    vi) optionally 0.1 to 0.5 parts by weight of at least one thickener, and
    vii) optionally 0.2 to 3.0 parts by weight of at least one dispersing agent, wherein the sum of the at least one natural source of calcium carbonate and the at least one further pigment in the coating layer is 100.0 parts by weight.

The inventors surprisingly found out that the foregoing rotogravure printing medium according to the present invention shows satisfactory coating runnability, and has improved optical and mechanical characteristics, especially a decreased amount of missing dots or partially formed dots at maintained or even improved brightness, opacity (light scattering) and roughness. More precisely, the inventors found that the runnability and the optical and mechanical characteristics of a rotogravure printing medium can be improved by a coating layer having a specific composition as defined herein.

According to another aspect of the present invention, a coating composition for rotogravure printing media is provided, the composition consisting of
  a) >50.0 to 100.0 parts by weight of at least one natural source of calcium carbonate, the at least one natural source of calcium carbonate comprises particles having a BET specific surface area of from 4.0 to 12.0 $m^2/g$, measured by the BET nitrogen method,
  b) 0.0 to ≤50.0 parts by weight of at least one further pigment suitable for papermaking,
  c) 3.0 to 6.0 parts by weight of at least one synthetic binder,
  d) 0.1 to 0.5 parts by weight of at least one stearate salt,
  e) at least one aqueous solvent,
  f) optionally 1.0 to 1.5 parts by weight of at least one polysaccharide, g) optionally 0.1 to 0.5 parts by weight of at least one thickener, and
h) optionally 0.2 to 3.0 parts by weight of at least one dispersing agent, wherein the sum of the at least one natural source of calcium carbonate and the at least one further pigment in the coating composition is 100.0 parts by weight. According to one embodiment the coating composition has a solid content from 10.0 to 80.0 wt.-%, preferably from 30.0 to 75.0 wt.-%, more preferably from 40.0 to 70.0 wt.-%, and most preferably from 45.0 to 65.0 wt.-%, based on the total weight of the coating composition.

According to an even further aspect of the present invention, a method for producing a rotogravure printing medium is provided, the method comprising the steps of:
a) providing a substrate having a first side and a reverse side, and
b) applying a coating composition on at least the first side of the substrate to form a coating layer.

According to one embodiment the method further comprises step c) of drying the coating layer. According to another embodiment the coating composition is applied by high speed coating, metering size press, curtain coating, spray coating, or electrostatic coating, and preferably by high speed coating.

According to still another aspect of the present invention, an use of a rotogravure printing medium in a printing application, preferably in rotogravure printing using electrostatic assist (ESA), is provided.

Advantageous embodiments of the inventive rotogravure printing medium are defined in the corresponding subclaims.

According to one embodiment the substrate is selected from paper, cardboard, containerboard, plastic, cellophane, textile, wood, metal, or concrete, preferably paper, cardboard, or containerboard.

According to another embodiment the at least one natural source of calcium carbonate is dolomite and/or at least one natural ground calcium carbonate (NGCC), preferably the at least one natural ground calcium carbonate (NGCC) is selected from the group comprising marble, chalk, limestone and mixtures thereof.

According to yet another embodiment the at least one natural source of calcium carbonate comprises particles a) having a BET specific surface area of from 5.0 to 10.0 m$^2$/g, measured by the BET nitrogen method, and/or b) having a weight median particle size $d_{50}$ of ≤2.5 µm, preferably from 0.1 to 2.5 µm, more preferably from 0.1 to 2.0 µm, and most preferably from 0.5 to 2.0 µm or from 0.2 to 1.5 µm, or c) having a i) weight particle size $d_{75}$ of 0.7 to 3.0 µm, ii) weight median particle size $d_{50}$ of 0.5 to 2.0 µm, iii) weight particle size $d_{25}$ of 0.1 to 1.0 µm, as measured according to the sedimentation method, and/or d) consisting of calcium carbonate in an amount of ≥50.0 wt.-%, preferably of 90.0 wt.-%, more preferably of ≥95.0 wt.-% and most preferably of ≥97.0 wt.-%, based on the total dry weight of the natural source of calcium carbonate.

According to one embodiment the at least one natural source of calcium carbonate consists of crumbles comprising dolomite and/or the at least one natural ground calcium carbonate (NGCC), and optionally the at least one further pigment suitable for papermaking.

According to another embodiment a) the at least one further pigment suitable for papermaking is selected from the group comprising precipitated calcium carbonate (PCC), metal oxides such as titanium dioxide and/or aluminium trioxide, metal hydroxides such as aluminium tri-hydroxide, metal salts such as sulfates, silicates such as talc and/or kaolin and/or kaolin clay and/or mica, carbonates such as magnesium carbonate and/or gypsum, satin white and mixtures thereof, and/or b) the at least one synthetic binder is selected from the group comprising polyvinylalcohol, styrene-butadiene latex, styrene-acrylate latex, styrene-acrylic acrylonitrile latex, polyvinyl acetate latex and mixtures thereof, and is preferably a styrene-butadiene latex, and/or c) the at least one stearate salt is a stearate salt of a monovalent or divalent cation, preferably the stearate salt of a monovalent or divalent cation is selected from the group comprising sodium stearate, potassium stearate, calcium stearate, magnesium stearate, strontium stearate and mixtures thereof, more preferably the stearate salt of a monovalent or divalent cation is calcium stearate.

According to yet another embodiment the coating layer consists of a) 51.0 to 100.0 parts by weight of the at least one natural source of calcium carbonate, and b) 0.0 to 49.0 parts by weight of the at least one further pigment suitable for papermaking.

According to one embodiment the at least one polysaccharide and/or the at least one thickener and/or the at least one dispersing agent is/are present in the coating layer.

According to another embodiment a) the at least one polysaccharide is selected from starch and/or guar, and/or b) the at least one thickener is selected from cellulosic derivatives, such as ethylhydroxylethyl cellulose and/or carboxymethyl cellulose, acrylic copolymers and mixtures thereof and/or the at least one dispersing agent is a polyacrylate-based dispersing agent.

According to yet another embodiment the coating layer has a coat weight from 1.0 to 50.0 g/m$^2$, preferably from 2.0 to 40.0 g/m$^2$, more preferably from 3.0 to 30.0 g/m$^2$, and most preferably from 5.0 to 20.0 g/m$^2$.

According to one embodiment the rotogravure printing medium consists of the substrate and the coating layer being in contact with at least the first side of the substrate.

It should be understood that for the purpose of the present invention, the following terms have the following meaning.

For the purpose of the present invention, the term "substrate" is to be understood as any material having a surface suitable for rotogravure printing, such as paper, cardboard, containerboard, plastic, cellophane, textile, wood, metal, or concrete.

Throughout the present application, the term "parts by weight" refers to 100 parts by total dry weight of the at least one natural source of calcium carbonate and, if present, the at least one further pigment.

The term "coating layer" refers to one or more layers, coverings, films, skins etc., formed, created, prepared etc., from a coating composition which remains predominantly on the surface of the printing medium.

The term "natural source of calcium carbonate" in the meaning of the present invention refers to a calcium carbonate-containing material obtained from natural sources, such as limestone, marble, chalk or dolomite, and processed through a wet and/or dry treatment such as grinding, screening and/or fractionation, for example by a cyclone or classifier. A "specific surface area" (SSA) of a particulate material in the meaning of the present invention is defined as the surface area of the particulate material divided by the mass of the particulate material. As used herein, the specific surface area is measured by adsorption using the BET isotherm (ISO 9277:2010), and is specified in m$^2$/g.

A "pigment" in the meaning of the present invention can be a mineral pigment or a synthetic pigment. For the purpose of the present invention, a "mineral pigment" is a solid substance having a definite inorganic chemical composition and characteristic crystalline and/or amorphous structure, while a "synthetic pigment" is, e.g., a plastic pigment based on a polymer, such as a hollow sphere polymeric pigment, or a precipitated calcium carbonate (PCC). A "precipitated calcium carbonate" (PCC) in the meaning of the present invention is a synthesized material, generally obtained by precipitation following reaction of carbon dioxide and lime in an aqueous environment or by precipitation of a calcium and carbonate ion source in water.

The term "binder" as used in the present invention is a compound that is used to bind together two or more other materials in mixtures, for example, the coating pigment particles contained in a coating composition and provide for their adhesion to the surface material of a substrate.

The term "thickener" in the meaning of the present invention refers to an additive that is used to increase the viscosity of a coating composition to a desired value.

For the purposes of the present invention, the term "viscosity" with reference to liquid coating compositions, refers to Brookfield viscosity. The Brookfield viscosity may be measured by a Brookfield viscometer at 23° C. at 100 rpm and is specified in mPa·s.

Throughout the present document, the "particle size" of a pigment particle is described by its distribution of particle sizes. The value $d_x$ represents the diameter relative to which x % by weight of the particles have diameters less than $d_x$. This means that the $d_{20}$ value is the particle size at which 20.0 wt.-% of all particles are smaller, and the $d_{75}$ value is the particle size at which 75.0 wt.-% of all particles are smaller. The $d_{50}$ value is thus the weight median particle size, i.e. 50.0 wt.-% of all particle grains are bigger or smaller than this particle size. For the purpose of the present invention the particle size is specified as weight median particle size $d_{50}$ unless indicated otherwise. For determining the weight median particle size $d_{50}$ value, a Sedigraph™ 5120 or a Sedigraph™ 5100 device from the company Micromeritics Instrument Corporation, USA can be used.

Where the term "comprising" is used in the present description and claims, it does not exclude other elements. For the purposes of the present invention, the term "consisting of" is considered to be a preferred embodiment of the term "comprising of". If hereinafter a group is defined to comprise at least a certain number of embodiments, this is also to be understood to disclose a group, which preferably consists only of these embodiments.

Where an indefinite or definite article is used when referring to a singular noun, e.g. "a", "an" or "the", this includes a plural of that noun unless something else is specifically stated.

Terms like "obtainable" or "definable" and "obtained" or "defined" are used interchangeably. This means that, unless the context clearly dictates otherwise, the term "obtained" does not mean to indicate that an embodiment must be obtained by, e.g. the sequence of steps following the term "obtained" even though such a limited understanding is always included by the terms "obtained" or "defined" as a preferred embodiment.

In the following, the details and preferred embodiments of the inventive rotogravure printing medium will be described in more detail. It is to be understood that these technical details and embodiments also apply to the inventive method for producing said rotogravure printing medium, the inventive coating composition and its use.

Rotogravure Printing Medium

According to point a) of the present invention, the rotogravure printing medium comprises a substrate having a first side and a reverse side.

It is appreciated that the substrate can serve as a support for the coating layer and may be opaque, translucent, or transparent.

According to one embodiment of the present invention, the substrate is selected from paper, cardboard, containerboard, plastic, cellophane, textile, wood, metal, or concrete. Preferably, the substrate is paper, cardboard, or containerboard.

The paper substrate can be a wood free or a wood containing paper. Preferably, the paper substrate is a wood-containing paper. A suitable pulp constituting the paper substrate may be, for example, a natural pulp, a recycled pulp, a synthetic pulp, or the like and mixtures thereof. Into the paper substrate can be incorporated, if necessary, various additives such as a sizing agent, a paper-strength enhancer, a filler, an antistatic agent, a fluorescent whitening agent, and a dye, which are generally used in paper manufacture. Moreover, the paper substrate may be precoated with a surface sizing agent, a surface paper-strength enhancer, a fluorescent whitening agent, an antistatic agent, a dye, an anchoring agent, and the like. If required, the paper substrate may be subjected to a surface smoothing treatment in a usual manner using a calendering apparatus during or after paper-making.

The cardboard substrate may comprise carton board or boxboard, corrugated cardboard, or non-packaging cardboard such as chromoboard, or drawing cardboard. The containerboard substrate may encompass linerboard and/or a corrugating medium. Both linerboard and a corrugating medium are used to produce corrugated board.

The paper, cardboard, or containerboard substrate can have a basis weight from 10 to 1 000 g/m², preferably from 15 to 800 g/m², more preferably from 20 to 700 g/m², even more preferably from 25 to 600 g/m² and most preferably from 30 to 500 g/m².

According to another embodiment, the substrate is a plastic substrate. Suitable plastic materials are, for example, polyethylene, polypropylene, polyvinylchloride, polyesters, polycarbonate resins or fluorine-containing resins. Examples for suitable polyesters are poly(ethylene terephthalate), poly(ethylene naphthalate) or poly(ester diacetate). An example for a fluorine-containing resins is poly(tetrafluoro ethylene). The plastic substrate may be filled by a mineral filler, an organic pigment, an inorganic pigment, or mixtures thereof.

The substrate may consist of only one layer of the above-mentioned materials or may comprise a layer structure having several sublayers of the same material or different materials. According to one embodiment, the substrate is structured by one layer. According to another embodiment the substrate is structured by at least two sublayers, preferably three, five, or seven sublayers. Preferably the sublayers of the substrate are made from paper, cardboard, containerboard and/or plastic.

According to one exemplary embodiment, the substrate is structured by two sublayers comprising a flat sublayer and a sublayer having a non-flat structure, e.g. a corrugated structure. According to another exemplary embodiment, the substrate is structured by three sublayers comprising two flat outer sublayers and an intermediate sublayer having a non-flat structure, e.g. a corrugated structure. According to another exemplary embodiment, the substrate is structured by five sublayers comprising two flat outer sublayers, a flat intermediate sublayer, and between the outer sublayer and the intermediate sublayer two sublayers having a non-flat structure, e.g. a corrugated structure. According to still another embodiment, the substrate is structured by seven sublayers comprising two flat outer sublayers, two flat intermediate sublayers, and three sublayers having a non-flat structure, e.g. a corrugated structure, wherein two non-flat sublayers are between the outer sublayer and the intermediate sublayers, and one non-flat sublayer is between the two intermediate sublayers. However, the substrate of the rotogravure printing medium according to the present invention may also comprise any other suitable single or multilayer structure.

The substrate of the rotogravure printing medium can have a thickness from 0.01 to 10 mm, from 0.06 to 1 mm, or from 0.03 to 0.5 mm. According to a preferred embodiment, the substrate has a thickness from 0.05 to 0.3 mm.

According to one embodiment, the substrate is pre-coated, preferably with a carbonate, and more preferably with a calcium carbonate, and most preferably with a precipitated calcium carbonate, modified calcium carbonate or ground calcium carbonate, or mixtures thereof.

Such a pre-coat may improve the optical print density and the print gloss of the inventive print medium.

Alternatively, the substrate is free of a pre-coating. That is to say, the coating layer is directly applied on at least the first side of the substrate.

According to point b) of the present invention, the rotogravure printing medium comprises a coating layer being in contact with at least the first side of the substrate.

According to one embodiment the rotogravure printing medium consists of the substrate and the coating layer being in contact with at least the first side of the substrate.

The term "at least" the first side of the substrate in the meaning of the present invention means that a first coating layer is in contact with the first side of the substrate and optionally a second coating layer can be in contact with the reverse side of the substrate.

It is appreciated that the first and second coating layer can be of the same or different composition. Preferably, the first and second coating layers are of the same composition.

In one embodiment of the present invention, the rotogravure printing medium comprises a first coating layer being in contact with the first side of the substrate. Alternatively, the rotogravure printing medium comprises a first coating layer being in contact with the first side of the substrate and a second coating layer being in contact with the reverse side of the substrate. For example, the rotogravure printing medium comprises, preferably consists of, a substrate and a first coating layer being in contact with the first side of the substrate or the rotogravure printing medium comprises, preferably consists of, a substrate and a first coating layer being in contact with the first side of the substrate and a second coating layer being in contact with the reverse side of the substrate.

Thus, the substrate comprises, preferably consists of, at least on the first side a coating layer and optionally a second coating layer can be in contact with the reverse side of the substrate. Preferably, the substrate comprises, more preferably consists of, a first coating layer on the first side and a second coating layer on the reverse side of the substrate. The function of the coating layer is to retain the pigment particles of the ink.

The ink compositions used in rotogravure printing are typically liquid compositions comprising a solvent or carrier liquid, dyes or pigments, humectants, organic solvents, detergents, thickeners, preservatives, and the like. Preferably, the solvent or carrier liquid is water-based, i.e. the amount of water in the solvent or carrier liquid is greater than the amount of organic solvents and/or volatile organic compounds contained therein. In contrast to inks containing mainly organic solvents and/or volatile organic compounds, water-based inks may encounter fewer environmental concerns.

Depending on the composition of the coating layer of the inventive rotogravure printing medium, the printing ink may require further additives such as surfactants, which ensure sufficient wetting of the coating layer. Alternatively or additionally, the coating layer of the inventive rotogravure printing medium can be composed such that sufficient wetting is ensured. The skilled person knows how to suitably select such ink compositions and/or coating layer compositions.

The coating layer may have a thickness of at least 1.0 μm, preferably of at least 5.0 μm, more preferably of at least 7.0 μm, even more preferably of at least 10.0 μm and most preferably of at least 12.0 μm. Preferably, the coating layer has a thickness in the range from 1.0 μm to 15.0 μm, more preferably in the range from 5.0 μm to 10.0 μm and most preferably in the range from 7.0 μm to 10.0 μm, still more preferably in the range from 15.0 μm to 90.0 μm and most preferably in the range from 20.0 μm to 75.0 μm.

According to one embodiment of the present invention, the coating layer has a coat weight from 1.0 to 50.0 g/m$^2$, preferably from 2.0 to 40.0 g/m$^2$, more preferably from 3.0 to 30.0 g/m$^2$, and most preferably from 5.0 to 20.0 g/m$^2$. For example, the coating layer has a coat weight from 5.0 to 10.0 g/m$^2$.

If the substrate comprises, more preferably consists of, a first coating layer on the first side and a second coating layer on the reverse side of the substrate, the coat weight of the first and second coating layer can be the same or different. Preferably, the coat weight of the first and second coating layer is the same. For example, the coat weight of the first coating layer is from 5.0 to 10.0 g/m$^2$ and the coat weight of the second coating layer is from 5.0 to 10.0 g/m$^2$.

It is appreciated that the term the coat weight is "the same" refers to a coat weight of the first coating layer which differs from the coat weight of the second coating layer by ≤2.0 g/m$^2$, preferably by ≤1.5 g/m$^2$ and most preferably by ≤1.0 g/m$^2$.

The coating layer of the inventive rotogravure printing medium consists of i) >50.0 to 100.0 parts by weight of at least one natural source of calcium carbonate, the at least one natural source of calcium carbonate comprises particles having a BET specific surface area of from 4.0 to 12.0 m$^2$/g, measured by the BET nitrogen method, ii) 0.0 to ≤50.0 parts by weight of at least one further pigment suitable for papermaking, iii) 3.0 to 6.0 parts by weight of at least one synthetic binder, iv) 0.1 to 0.5 parts by weight of at least one stearate salt, v) optionally 1.0 to 1.5 parts by weight of at least one polysaccharide, vi) optionally 0.1 to 0.5 parts by weight of at least one thickener, and vii) optionally 0.2 to 3.0 parts by weight of at least one dispersing agent, wherein the sum of the at least one natural source of calcium carbonate and the at least one further pigment in the coating layer is 100.0 parts by weight.

The inventors surprisingly found that the printing runnability during rotogravure printing and the optical and mechanical characteristics of a rotogravure printing medium can be improved if the substrate is coated with a coating layer comprising the at least one natural source of calcium carbonate with the above-defined properties.

The term "at least one" natural source of calcium carbonate in the meaning of the present invention means that the natural source of calcium carbonate comprises, preferably consists of, one or more natural sources of calcium carbonate.

In one embodiment of the present invention, the at least one natural source of calcium carbonate comprises, preferably consists of, one natural source of calcium carbonate. Alternatively, the at least one natural source of calcium carbonate comprises, preferably consists of, two or more natural sources of calcium carbonate. For example, the at least one natural source of calcium carbonate comprises, preferably consists of, two or three natural sources of calcium carbonate.

Preferably, the at least one natural source of calcium carbonate comprises, more preferably consists of, one natural source of calcium carbonate.

According to one embodiment of the present invention, the at least one natural source of calcium carbonate is dolomite and/or at least one natural ground calcium carbonate (NGCC).

"Dolomite" in the meaning of the present invention is a carbonatic calcium-magnesium-mineral having the chemical composition of $CaMg(CO_3)_2$ ("$CaCO_3.MgCO_3$"). Dolomite mineral contains at least 30.0 wt.-% $MgCO_3$, based on the total weight of dolomite, preferably more than 35.0 wt.-%, more than 40.0 wt.-%, typically from 45.0 to 46.0 wt.-% $MgCO_3$.

"Natural ground calcium carbonate" (NGCC) in the meaning of the present invention is a calcium carbonate obtained from natural sources, such as limestone, marble, chalk or mixtures thereof, and processed through a wet and/or dry treatment such as grinding, screening and/or fractionating, for example by a cyclone or classifier.

According to one embodiment the NGCC is obtained by dry grinding. According to another embodiment of the present invention the NGCC is obtained by wet grinding and subsequent drying.

In general, the grinding step can be carried out with any conventional grinding device, for example, under conditions such that refinement predominantly results from impacts with a secondary body, i.e. in one or more of: a ball mill, a rod mill, a vibrating mill, a roll crusher, a centrifugal impact mill, a vertical bead mill, an attrition mill, a pin mill, a hammer mill, a pulveriser, a shredder, a de-clumper, a knife cutter, or other such equipment known to the skilled man. In case the at least one natural source of calcium carbonate comprises a wet ground natural source of calcium carbonate, the grinding step may be performed under conditions such that autogenous grinding takes place and/or by horizontal ball milling, and/or other such processes known to the skilled man. The wet processed ground calcium carbonate-containing material thus obtained may be washed and dewatered by well known processes, e.g. by flocculation, filtration or forced evaporation prior to drying. The subsequent step of drying may be carried out in a single step such as spray drying, or in at least two steps. It is also common that such a calcium carbonate material undergoes a beneficiation step (such as a flotation, bleaching or magnetic separation step) to remove impurities.

For example, the NGCC is selected from the group comprising marble, chalk, limestone and mixtures thereof. In one preferred embodiment, the NGCC is marble or chalk.

According to one embodiment of the present invention, the at least one natural source of calcium carbonate comprises, preferably consists of, particles consisting of calcium carbonate in an amount of ≥50.0 wt.-%, preferably of 90.0 wt.-%, more preferably of ≥95.0 wt.-% and most preferably of ≥97.0 wt.-%, based on the total dry weight of the at least one natural source of calcium carbonate.

The term "dry" with regard to the at least one natural source of calcium carbonate is understood to be a material having less than 0.3% by weight of water relative to the weight of the at least one natural source of calcium carbonate. The % water is determined according to the Coulometric Karl Fischer measurement method, wherein the at least one natural source of calcium carbonate is heated to 220° C., and the water content released as vapour and isolated using a stream of nitrogen gas (at 100 ml/min) is determined in a Coulometric Karl Fischer unit.

The at least one natural source of calcium carbonate preferably comprises, more preferably consists of, particles having a weight median particle size $d_{50}$ of ≤2.5 μm, as measured by the sedimentation method.

In one embodiment of the present invention, the at least one natural source of calcium carbonate comprises, preferably consists of, particles having a weight median particle size $d_{50}$ preferably from 0.1 to 2.5 μm, more preferably from 0.1 to 2.0 μm, and most preferably from 0.5 to 2.0 μm or from 0.2 to 1.5 μm, as measured by the sedimentation method.

Additionally or alternatively, the at least one natural source of calcium carbonate comprises, preferably consists of, particles having a i) weight particle size $d_{75}$ of 0.7 to 3.0 μm, ii) weight median particle size $d_{50}$ of 0.5 to 2.0 μm, iii) weight particle size $d_{25}$ of 0.1 to 1.0 μm, as measured according to the sedimentation method.

Additionally or alternatively, the at least one natural source of calcium carbonate comprises, preferably consists of, particles of which at least 50.0 wt.-%, preferably at least 55.0 wt.-%, more preferably at least 58.0 wt.-% and most preferably from 58.0 to 70.0 wt.-%, have a weight median particle size of less than 2.5 μm, more preferably of less than 2.0 μm, even more preferably of less than 1.5 μm and most preferably of less than 1.0 μm, as measured according to the sedimentation method.

The at least one natural source of calcium carbonate may comprise, preferably consist of, particles having a top cut, for example, of below 9.5 μm. The term "top cut" (or top size), as used herein, means the particle size value wherein at least 98.0 wt.-% of the material particles are less than that size. Preferably, the at least one natural source of calcium carbonate comprises, preferably consists of, particles having a top cut of below 8.0 μm and more preferably of below 7.5 μm. For example, the at least one natural source of calcium carbonate comprises, preferably consists of, particles having a top cut of below 3.5 μm, more preferably of below 3.0 μm and most preferably of below 2.5 μm.

It is one requirement of the instant invention that the at least one natural source of calcium carbonate comprises particles having a BET specific surface area of from 4.0 to 12.0 m²/g, measured by the BET nitrogen method. Preferably, the at least one natural source of calcium carbonate consists of particles having a BET specific surface area of from 4.0 to 12.0 m²/g, measured by the BET nitrogen method.

In one embodiment the at least one natural source of calcium carbonate comprises particles having a BET specific surface area of from 5.0 to 10.0 m²/g, measured by the BET nitrogen method. Preferably, the at least one natural source of calcium carbonate consists of particles having a BET specific surface area of from 5.0 to 10.0 m²/g, measured by the BET nitrogen method.

In one embodiment the at least one natural source of calcium carbonate consists of crumbles comprising dolomite and/or the at least one natural ground calcium carbonate (NGCC), and optionally at least one further pigment suitable for papermaking.

For the purpose of the present invention, the term "crumbles" refers to a material being composed of a plurality of particles comprising the at least one source of calcium carbonate and moisture such that the crumbles have solids content of 78.0 wt.-% to 90.0 wt.-%, based on the total weight of the crumbles.

Preferably, the crumbles consists of dolomite and/or the at least one natural ground calcium carbonate (NGCC). For example, the crumbles consists of the at least one natural ground calcium carbonate (NGCC). In one embodiment of the present invention, the at least one natural ground calcium carbonate (NGCC) is selected from the group comprising marble, chalk, limestone and mixtures thereof.

It is appreciated that the crumbles preferably comprise, more preferably consist of, particles having a BET specific surface area of from 4.0 to 12.0 m²/g, preferably from 5.0 to 10.0 m²/g, measured by the BET nitrogen method, measured by the BET nitrogen method.

Additionally or alternatively, the crumbles comprise, preferably consist of, particles having a weight median particle size $d_{50}$ preferably from 0.5 to 2.0 μm, as measured by the sedimentation method.

In one embodiment of the present invention, the crumbles comprise, preferably consist of, particles having a weight median particle size $d_{50}$ preferably from 0.5 to 1.9 μm, more preferably from 0.6 to 1.8 μm, and most preferably from 0.7 to 1.8 μm, as measured by the sedimentation method.

Additionally or alternatively, the crumbles comprise, preferably consist of, particles having a weight particle size $d_{75}$ from 0.7 to 3.0 μm, as measured by the sedimentation method. In one embodiment of the present invention, the crumbles comprise, preferably consist of, particles having a weight particle size $d_{75}$ from 0.7 to 2.9 μm, and most preferably from 0.7 to 2.8 μm, as measured by the sedimentation method.

Additionally or alternatively, the crumbles comprise, preferably consist of, particles having a weight particle size $d_{25}$ from 0.1 to 1.0 μm, as measured by the sedimentation method. In one embodiment of the present invention, the crumbles comprise, preferably consist of, particles having a weight particle size $d_{25}$ from 0.1 to 0.9 μm, and most preferably from 0.15 to 0.8 μm, as measured by the sedimentation method.

According to one embodiment the crumbles preferably comprise, more preferably consist of, particles having a i) weight particle size $d_{75}$ of 0.7 to 3.0 μm, ii) weight median particle size $d_{50}$ of 0.5 to 2.0 μm, and iii) weight particle size $d_{25}$ of 0.1 to 1.0 μm, as measured according to the sedimentation method.

Preferably, the crumbles preferably comprise, more preferably consist of, particles have a i) weight particle size $d_{75}$ of 0.7 to 2.9 μm, ii) weight median particle size $d_{50}$ of 0.5 to 1.9 μm and iii) weight particle size $d_{25}$ of 0.1 to 0.9 μm, as measured according to the sedimentation method. More preferably, the crumbles preferably comprise, more preferably consist of, particles have a i) weight particle size $d_{75}$ of 0.7 to 2.8 μm, ii) weight median particle size $d_{50}$ of 0.6 to 1.8 μm and iii) weight particle size $d_{25}$ of 0.15 to 0.8 μm, as measured according to the sedimentation method.

Additionally or alternatively, the crumbles preferably comprise, more preferably consist of, particles of which at least 30.0 wt.-%, preferably at least 50.0 wt.-%, more preferably at least 58.0 wt.-% and most preferably from 58.0 to 95.0 wt.-%, have a weight particle size of ≤2.0 μm, more preferably of ≤1.8 μm, even more preferably of ≤1.5 μm and most preferably of ≤1.0 μm, as measured according to the sedimentation method.

For example, the crumbles preferably comprise, more preferably consist of, particles of which at least 30.0 to 85.0 wt.-%, preferably from 50.0 to 85.0 wt.-% and most preferably from 58.0 to 85.0 wt.-%, have a weight particle size of ≤1.0 μm, as measured according to the sedimentation method.

Additionally or alternatively, the crumbles preferably comprise, more preferably consist of, particles of which at least 50.0 to 95.0 wt.-%, preferably from 58.0 to 95.0 wt.-% and most preferably from 80.0 to 95.0 wt.-%, have a weight particle size of ≤2.0 μm, as measured according to the sedimentation method.

The crumbles preferably comprise, more preferably consist of, particles having a controlled low top cut, for example, of ≤9.5 μm. The term "top cut" (or top size), as used herein, means the particle size value wherein at least 98.0 wt.-% of the material particles are less than that size. Preferably, the crumbles preferably comprise, more preferably consist of, particles having a top cut of ≤8.0 μm and more preferably of ≤7.5 μm. For example, the crumbles preferably comprise, more preferably consist of, particles having a top cut of ≤6.0 μm and more preferably of ≤5.0 μm.

It is appreciated that the crumbles have specific solids content. Preferably, the crumbles have solids content of 78.0 wt.-% to 90.0 wt.-%, based on the total weight of the crumbles. More preferably, the crumbles have solids content of 80.0 wt.-% to 88.0 wt.-%, based on the total weight of the crumbles.

In one embodiment of the present invention, the crumbles comprise on at least a part of the particle's accessible surface area a treatment layer comprising a hydrophobizing agent.

The term "accessible" surface area of a material refers to the part of the material surface which is in contact with a liquid phase of an aqueous solution, suspension, dispersion or reactive molecules such as a hydrophobizing agent.

Preferably, the hydrophobizing agent is an aliphatic carboxylic acid having a total amount of carbon atoms from C4 to C24 and/or reaction products thereof and/or at least one mono-substituted succinic anhydride consisting of succinic anhydride mono-substituted with a group selected from a linear, branched, aliphatic and cyclic group having a total amount of carbon atoms from C2 to C30 in the substituent and/or reaction products thereof and/or a phosphoric acid ester blend of one or more phosphoric acid mono-ester and/or reaction products thereof and one or more phosphoric acid di-ester and/or reaction products thereof.

The term "reaction products" of the aliphatic carboxylic acid in the meaning of the present invention refers to products obtained by contacting the at least one source of calcium carbonate with the at least one aliphatic carboxylic acid. Said reaction products are formed between at least a part of the applied at least one aliphatic carboxylic acid and reactive molecules located at the surface of the source of calcium carbonate.

More preferably, the hydrophobizing agent is an aliphatic carboxylic acid having a total amount of carbon atoms from C4 to C24 and/or reaction products thereof such as stearic acid and/or reaction products thereof.

The crumbles are especially characterized by a low moisture pick up susceptibility.

The "moisture pick-up susceptibility" of a material refers to the amount of moisture absorbed on the surface of said material within a certain time upon exposure to a defined humid atmosphere and is expressed in mg/g.

For example, the crumbles have a moisture pick up susceptibility such that its total surface moisture level is ≤0.6 mg/g, preferably ≤0.5 mg/g, more preferably ≤0.4 mg/g and most preferably ≤0.3 mg/g of the dry crumbles after exposure to an atmosphere of 50% of relative humidity for 48 hours at a temperature of 23° C.

Additionally or alternatively, the crumbles have a moisture content of from 0.2 wt.-% to 0.6 wt.-%, preferably from 0.2 wt.-% to 0.4 wt.-% and most preferably from 0.25 wt.-% to 0.35 wt.-% based on the total dry weight of the crumbles.

It is appreciated that the crumbles provide exceptional optical characteristics. In particular, it is appreciated that the crumbles have a degree of whiteness R457, measured in accordance with the ISO 2469 Standard, of at least 85.0%, more preferably of at least 87.0%, even more preferably of at least 89.0% and most preferably of at least 91.0%. For example, the crumbles have a degree of whiteness R457, measured in accordance with the ISO 2469 Standard, of from 85.0 to 99.0%, preferably from 87.0 to 99.0%, more preferably from 89.0 to 99.0% and most preferably from 91.0% to 99.0%. Most preferably, the crumbles have a degree of whiteness R457, measured in accordance with the ISO 2469 Standard, of at least 93.0%, e.g. from 93.0 to 99.0%.

Additionally or alternatively, the crumbles have a Yellowness Index according to DIN 6167 of less than 3.0, preferably of less than 2.5, more preferably of less than 2.0 and most preferably of less than 1.5.

According to one embodiment, the at least one natural source of calcium carbonate will be derived from an aqueous suspension of the at least one natural source of calcium carbonate. According to one embodiment of the present invention, the aqueous suspension of the at least one natural source of calcium carbonate has solids content of from 10.0 wt.-% to 82.0 wt.-%, preferably from 50.0 wt.-% to 81.0 wt.-%, and most preferably from 50.0 wt.-% to 78.0 wt.-%, based on the total weight of the aqueous suspension of the at least one natural source of calcium carbonate.

According to one embodiment of the present invention, the aqueous suspension of the at least one natural source of calcium carbonate is a concentrated aqueous suspension of at least one dispersed natural source of calcium carbonate, which preferably has solids content from 50.0 wt.-% to 78.0 wt.-%, based on the total weight of the aqueous suspension of the at least one natural source of calcium carbonate.

If the at least one natural source of calcium carbonate consists of crumbles, the at least one natural source of calcium carbonate is preferably in dry form.

In addition to the at least one natural source of calcium carbonate, the coating layer can comprise at least one further pigment suitable for papermaking.

The term "at least one" further pigment suitable for papermaking in the meaning of the present invention means that the pigment comprises, preferably consists of, one or more pigments.

In one embodiment of the present invention, the at least one further pigment suitable for papermaking comprises, preferably consists of, one pigment. Alternatively, the at least one further pigment suitable for papermaking comprises, preferably consists of, two or more pigments. For example, the at least one further pigment suitable for papermaking comprises, preferably consists of, two or three pigments.

Preferably, the at least one further pigment suitable for papermaking comprises, more preferably consists of, one further pigment suitable for papermaking.

In one embodiment the coating layer is free of further pigments suitable for papermaking.

If the coating layer contains at least one further pigment suitable for papermaking, the at least one further pigment suitable for papermaking is selected from the group comprising precipitated calcium carbonate (PCC), metal oxides such as titanium dioxide and/or aluminium trioxide, metal hydroxides such as aluminium tri-hydroxide, metal salts such as sulfates, silicates such as talc and/or kaolin and/or kaolin clay and/or mica, carbonates such as magnesium carbonate and/or gypsum, satin white and mixtures thereof.

"Precipitated calcium carbonate" (PCC) in the meaning of the present invention is a synthesized material, generally obtained by precipitation following reaction of carbon dioxide and lime in an aqueous environment or by precipitation of a calcium and carbonate ion source in water. PCC may be one or more of the aragonitic, vateritic and calcitic mineralogical crystal forms. Preferably, PCC is one of the aragonitic, vateritic and calcitic mineralogical crystal forms.

Aragonite is commonly in the acicular form, whereas vaterite belongs to the hexagonal crystal system. Calcite can form scalenohedral, prismatic, spheral and rhombohedral forms. PCC can be produced in different ways, e.g. by precipitation with carbon dioxide, the lime soda process, or the Solvay process in which PCC is a by-product of ammonia production. The obtained PCC slurry can be mechanically dewatered and dried.

If the coating layer contains at least one further pigment suitable for papermaking, the at least one further pigment suitable for papermaking is preferably precipitated calcium carbonate (PCC).

The sum of the at least one natural source of calcium carbonate and the at least one further pigment in the coating layer is 100.0 parts by weight.

It is one requirement of the present invention that the coating layer consists of >50.0 to 100.0 parts by weight of the at least one natural source of calcium carbonate, and of 0.0 to ≤50.0 parts by weight of the at least one further pigment suitable for papermaking.

For example, the coating layer consists of 51.0 to 100.0 parts by weight of the at least one natural source of calcium carbonate, and of 0.0 to 49.0 parts by weight of the at least one further pigment suitable for papermaking.

In one embodiment the coating layer consists of 60.0 to 100.0 parts by weight of the at least one natural source of calcium carbonate, and of 0.0 to 40.0 parts by weight of the at least one further pigment suitable for papermaking, preferably of 70.0 to 100.0 parts by weight of the at least one natural source of calcium carbonate, and of 0.0 to 30.0 parts by weight of the at least one further pigment suitable for papermaking, more preferably of 80.0 to 100.0 parts by weight of the at least one natural source of calcium carbonate, and of 0.0 to 20.0 parts by weight of the at least one further pigment suitable for papermaking and most preferably of 90.0 to 100.0 parts by weight of the at least one natural source of calcium carbonate, and of 0.0 to 10.0 parts by weight of the at least one further pigment suitable for papermaking.

For example, the coating layer consists of 60.0 to 99.9 parts by weight of the at least one natural source of calcium carbonate, and of 0.1 to 40.0 parts by weight of the at least one further pigment suitable for papermaking, preferably of 70.0 to 99.9 parts by weight of the at least one natural source of calcium carbonate, and of 0.1 to 30.0 parts by weight of the at least one further pigment suitable for papermaking, more preferably of 70.0 to 90.0 parts by weight of the at least one natural source of calcium carbonate, and of 10.0 to 30.0 parts by weight of the at least one further pigment suitable for papermaking and most preferably of 70.0 to 80.0 parts by weight of the at least one natural source of calcium carbonate, and of 20.0 to 30.0 parts by weight of the at least one further pigment suitable for papermaking.

For example, the coating layer consists of 60.0 to 99.9 parts by weight of the at least one natural source of calcium carbonate, and of 0.1 to 40.0 parts by weight of precipitated calcium carbonate (PCC) as the at least one further pigment suitable for papermaking, preferably of 70.0 to 99.9 parts by weight of the at least one natural source of calcium carbonate, and of 0.1 to 30.0 parts by weight of precipitated calcium carbonate (PCC) as the at least one further pigment suitable for papermaking, more preferably of 70.0 to 90.0 parts by weight of the at least one natural source of calcium carbonate, and of 10.0 to 30.0 parts by weight of precipitated calcium carbonate (PCC) as the at least one further pigment suitable for papermaking and most preferably of 70.0 to 80.0 parts by weight of the at least one natural source of calcium carbonate, and of 20.0 to 30.0 parts by weight of precipitated calcium carbonate (PCC) as the at least one further pigment suitable for papermaking.

In one embodiment, the coating layer consists of 60.0 to 99.9 parts by weight of the at least one natural source of calcium carbonate in the form of crumbles, and of 0.1 to 40.0 parts by weight of kaolin or talc as the at least one further pigment suitable for papermaking, preferably of 70.0 to 99.9 parts by weight of the at least one natural source of calcium carbonate in the form of crumbles, and of 0.1 to 30.0 parts by weight of kaolin or talc as the at least one further pigment suitable for papermaking, more preferably of 70.0 to 90.0 parts by weight of the at least one natural source of calcium carbonate in the form of crumbles, and of 10.0 to 30.0 parts by weight of kaolin or talc as the at least one further pigment suitable for papermaking and most preferably of 70.0 to 80.0 parts by weight of the at least one natural source of calcium carbonate in the form of crumbles, and of 20.0 to 30.0 parts by weight of kaolin or talc as the at least one further pigment suitable for papermaking.

According to an alternative embodiment, the coating layer consists of 75.0 parts by weight of the at least one natural source of calcium carbonate in the form of crumbles, and of 25.0 parts by weight of kaolin and/or talc as the at least one further pigment suitable for papermaking. Preferably, the coating layer consists of 75.0 parts by weight of the at least one natural source of calcium carbonate in the form of crumbles, and of 25.0 parts by weight of kaolin or talc as the at least one further pigment suitable for papermaking.

According to one embodiment of the present invention the coating layer is free of the at least one further pigment suitable for papermaking. That is to say, the coating layer consists of 100.0 parts by weight of the at least one natural source of calcium carbonate comprising particles having a BET specific surface area of from 4.0 to 12.0 m²/g, measured by the BET nitrogen method.

The coating layer further contains at least one synthetic binder.

The term "at least one" synthetic binder in the meaning of the present invention means that the synthetic binder comprises, preferably consists of, one or more synthetic binders.

In one embodiment of the present invention, the at least one synthetic binder comprises, preferably consists of, one synthetic binder. Alternatively, the at least one synthetic binder comprises, preferably consists of, two or more synthetic binders. For example, the at least one synthetic binder comprises, preferably consists of, two or three synthetic binders.

Preferably, the at least one synthetic binder comprises, more preferably consists of, one synthetic binder.

Any suitable synthetic binder may be used in the coating layer of the invention that is known to the skilled person. For example, the at least one synthetic binder may be a hydrophilic polymer such as, for example, polyvinylalcohol, polyvinyl pyrrolidone, polyoxazolines, polyvinylacetate latex, partially hydrolyzed polyvinyl acetate/vinyl alcohol, polyacrylamide, polyalkylene oxide, sulfonated or phosphated polyesters and polystyrenes, and mixtures thereof. It is also possible to use other synthetic binders such as hydrophobic materials, for example, styrene-butadiene latex, styrene-acrylate latex, styrene-acrylic acrylonitrile latex, polyurethane latex, polyester latex, poly(n-butyl acrylate), poly(n-butyl methacrylate), poly(2-ethylhexyl acrylate), copolymers of n-butylacrylate and ethylacrylate, copolymers of vinylacetate and n-butylacrylate, and the like.

According to one embodiment, the at least one synthetic binder is selected from the group comprising polyvinylalcohol, styrene-butadiene latex, styrene-acrylate latex, styrene-acrylic acrylonitrile latex, polyvinyl acetate latex and mixtures thereof. Preferably, the at least one synthetic binder is a styrene-butadiene latex. An example of a styrene-butadiene latex is Litex 9460, commercially available from the company Synthomer. An example of a styrene-acrylate latex is Acronal S 201, commercially available from the company BASF.

According to one embodiment of the present invention, the amount of the at least one synthetic binder in the coating layer is from 3.0 to 6.0 parts by weight, preferably from 3.5 to 5.5 parts by weight, and most preferably from 4.0 to 5.5 parts by weight.

The coating layer further contains at least one stearate salt.

The term "at least one" stearate salt in the meaning of the present invention means that the stearate salt comprises, preferably consists of, one or more stearate salts.

In one embodiment of the present invention, the at least one stearate salt comprises, preferably consists of, one stearate salt. Alternatively, the at least one stearate salt comprises, preferably consists of, two or more stearate salts. For example, the at least one stearate salt comprises, preferably consists of, two or three stearate salts.

Preferably, the at least one stearate salt comprises, more preferably consists of, one stearate salt.

The at least one stearate salt may be any stearate salt that is known to the skilled person as being suitable for use in a coating layer of a rotogravure printing medium. For example, the at least one stearate salt is a stearate salt of a monovalent or divalent cation. Preferably, the at least one stearate salt is a stearate salt of a monovalent or divalent cation being selected from the group comprising sodium stearate, potassium stearate, calcium stearate, magnesium stearate, strontium stearate and mixtures thereof.

Preferably, the at least one stearate salt is a stearate salt of a divalent cation. More preferably the stearate salt of a divalent cation is calcium stearate.

According to one embodiment of the present invention, the amount of the at least one stearate salt in the coating layer is from 0.1 to 0.5 parts by weight, preferably from 0.15 to 0.35 parts by weight, and most preferably from 0.2 to 0.3 parts by weight.

The coating layer may optionally further contain at least one polysaccharide.

The term "at least one" polysaccharide in the meaning of the present invention means that the polysaccharide comprises, preferably consists of, one or more polysaccharide.

In one embodiment of the present invention, the at least one polysaccharide comprises, preferably consists of, one polysaccharide. Alternatively, the at least one polysaccharide comprises, preferably consists of, two or more polysaccharides. For example, the at least one polysaccharide comprises, preferably consists of, two or three polysaccharides.

Preferably, the at least one polysaccharide comprises, more preferably consists of, one polysaccharide.

Polysaccharides are polymeric carbohydrate structures, formed of repeating units (at least 10) joined together by glycosidic bonds. These structures may be linear, but may also contain various degrees of branching. Polysaccharides may also contain slight modifications of the repeating unit. However, it is preferred that the at least one polysaccharide is free of modifications.

The at least one polysaccharide may be any polysaccharide that is known to the skilled person as being suitable for use in a coating layer of a rotogravure printing medium. For example, the at least one polysaccharide can be starch, guar, cellulose, glycogen, or chitin. Preferably, the at least one polysaccharide is selected from starch and/or guar.

"Starch" is a natural polysaccharide consisting of a large number of glucose units joined by glycosidic bonds. In general, starch comprises amylose, consisting of a linear chain of 1,4-linked α-D-glucopyranosyl units, and amylopectin, consisting of a linear chain of 1,4-linked α-D-glucopyranosyl units with 1,6-linked α-D-glucopyranosyl units.

"Guar" comprises a natural heteropolysaccharide (guaran) consisting of galactose units and mannose units usually in the ratio of 1:2 and is the endosperm component of guar seeds. In general, guar comprises a linear chain of 1,4-linked (3-D-mannopyranosyl units with 1,6-linked α-D-galactopyranosyl units. Guar seeds containing about 14 to 17 wt.-% husk, 35 to 42 wt.-% endosperm and 43 to 47 wt.-% embryo, are usually dry-milled and screened to separate out the endosperm which is the industrial guar of commerce.

In one embodiment, the starch and/or guar is/are present in its natural form in the coating layer, i.e. the starch and/or guar is/are untreated.

If the coating layer contains at least one polysaccharide, the amount of the at least one polysaccharide in the coating layer is from 1.0 to 1.5 parts by weight and preferably from 1.1 to 1.4 parts by weight.

In one embodiment the coating layer is free of polysaccharides.

The coating layer may optionally further contain at least one thickener.

The term "at least one" thickener in the meaning of the present invention means that the thickener comprises, preferably consists of, one or more thickener.

In one embodiment of the present invention, the at least one thickener comprises, preferably consists of, one thickener. Alternatively, the at least one thickener comprises, preferably consists of, two or more thickeners. For example, the at least one thickener comprises, preferably consists of, two or three thickeners.

Preferably, the at least one thickener comprises, more preferably consists of, one thickener.

The at least one thickener may be any thickener that is known to the skilled person as being suitable for use in a coating layer of a rotogravure printing medium for adjusting the rheology. For example, the at least one thickener may be a modified polysaccharide such as a cellulosic derivative and/or an acrylic copolymer.

"Modified polysaccharides" in the meaning of the present invention are polysaccharides, wherein at least a part of the hydroxyl groups is carboxylated or etherified. Additionally, the modified polysaccharides may contain other modifications such as aldehyde groups.

According to one embodiment of the present invention, the at least one thickener is a cellulosic derivative selected from carboxymethyl cellulose (CMC) and/or ethylhydroxyethyl cellulose (EHEC).

Ethylhydroxyethyl cellulose (EHEC) is a modified polysaccharide in which both ethyl and hydroxyethyl groups are attached to the anhydroglucose units by ether linkages. Ethylhydroxyethyl cellulose may be prepared from cellulose by treatment with alkali, ethylene oxide and ethyl chloride.

Carboxymethyl cellulose (CMC) may be prepared from cellulose by reaction with monochloroacetic acid in the presence of caustic soda to form the sodium salt of carboxymethylcellulose. The carboxymethyl cellulose (CMC) thus comprises carboxyl groups being attached to the anhydroglucose units.

Additionally or alternatively, the at least one thickener is an acrylic copolymer. The molecular weight $M_w$ of such acrylic copolymer is preferably in the range of 2 000 to 150 000 g/mol, with a molecular weight $M_w$ of 10 000 to 50 000 g/mol being especially preferred.

Examples of suitable acrylic copolymers includes styrene-acrylate latex, styrene-acrylic acrylonitrile latex, poly (n-butyl acrylate), poly(2-ethylhexyl acrylate), copolymers of n-butylacrylate and ethylacrylate, and the like.

If the coating layer further contains at least one thickener, the amount of the at least one thickener in the coating layer is from 0.1 to 0.5 parts by weight and preferably from 0.1 to 0.4 parts by weight.

It is appreciated that the at least one polysaccharide may be also used as the at least one thickener. That is to say, the coating layer may contain the at least one polysaccharide in an amount from 0.01 to 1.0 parts by weight, preferably from 0.05 to 0.5 parts by weight, if the at least one polysaccharide may further function as a thickener.

The coating layer may further contain at least one dispersing agent, preferably at least one anionic dispersing agent.

The term "at least one" dispersing agent in the meaning of the present invention means that the dispersing agent comprises, preferably consists of, one or more dispersing agents.

In one embodiment of the present invention, the at least one dispersing agent comprises, preferably consists of, one dispersing agent. Alternatively, the at least one dispersing agent comprises, preferably consists of, two or more dispersing agents. For example, the at least one dispersing agent comprises, preferably consists of, two or three dispersing agents.

Preferably, the at least one dispersing agent comprises, more preferably consists of, one dispersing agent.

Preferred dispersing agents such as anionic dispersing agents are polyacrylate-based dispersing agents like a salt of a polyacrylate. The at least one dispersing agent, preferably the at least one anionic dispersing agent, is preferably selected from the group consisting of an acrylic polymer, an acrylic and a vinylic copolymer and mixtures thereof. Dispersing agents such as acrylic polymers, acrylic and vinylic copolymers or mixtures thereof having multiple acidic sites can be partially or totally neutralised. In one embodiment, the at least one dispersing agent, preferably the at least one anionic dispersing agent, is partially or completely neutralized, preferably to a degree of 5.0% to 100.0%, more preferably to a degree of 25.0% to 100.0% and most preferably to a degree of 75.0% to 100.0% using a neutralizing agent containing ions of alkali metals and/or alkaline earth metals. For example, the acidic sites of the at least one dispersing agent, preferably the at least one anionic dispersing agent, are neutralized using a neutralizing agent containing only sodium.

Alternatively, the acidic sites of the at least one dispersing agent, preferably the at least one anionic dispersing agent, are neutralized using a neutralizing agent containing only potassium. In one embodiment, the acidic sites of the at least one dispersing agent, preferably the at least one anionic dispersing agent, are neutralized using a neutralizing agent containing a mixture of sodium and potassium.

It is appreciated that the coating layer preferably contains at least one dispersing agent, preferably an anionic dispersing agent.

If the coating layer further contains at least one dispersing agent, the amount of the at least one dispersing agent in the coating layer is from 0.2 to 3.0 parts by weight and preferably from 0.2 to 2.0 parts by weight.

Thus, the coating layer may contain the at least one polysaccharide and/or the at least one thickener and/or the at least one dispersing agent. For example, the at least one polysaccharide and the at least one thickener and the at least one dispersing agent are present in the coating layer. Alternatively, the at least one polysaccharide or the at least one thickener or the at least one dispersing agent is present in the coating layer.

Optionally, the coating layer may further contain optional additives. They will preferably be selected from additives typically used in the preparation of coating layers and are well known to a person skilled in the art. They may comprise at least one compound selected from the group comprising colorants, brightener and flame retardants.

In view of the very good results obtained with regard to the coating runnability and optical and mechanical characteristics, especially the decrease in the amount of missing dots or partially formed dots and the improvement in the brightness, opacity, light scattering and roughness, another aspect of the present invention refers to the use of the rotogravure printing medium in a printing application.

According to one embodiment, the printing application is a rotogravure printing using electrostatic assist (ESA).

However, the rotogravure printing medium of the present invention may also be used in other printing applications, such as offset printing, inkjet printing or flexography.

Coating Composition for a Rotogravure Printing Medium

According to another aspect of the present invention, a coating composition for rotogravure printing media is provided. The composition consists of
  a) >50.0 to 100.0 parts by weight of at least one natural source of calcium carbonate, the at least one natural source of calcium carbonate comprises particles having a BET specific surface area of from 4.0 to 12.0 m$^2$/g, measured by the BET nitrogen method,
  b) 0.0 to ≤50.0 parts by weight of at least one further pigment suitable for papermaking,
  c) 3.0 to 6.0 parts by weight of at least one synthetic binder,
  d) 0.1 to 0.5 parts by weight of at least one stearate salt,
  e) at least one aqueous solvent,
  f) optionally 1.0 to 1.5 parts by weight of at least one polysaccharide,
  g) optionally 0.1 to 0.5 parts by weight of at least one thickener, and
  h) optionally 0.2 to 3.0 parts by weight of at least one dispersing agent, wherein the sum of the at least one natural source of calcium carbonate and the at least one further pigment in the coating composition is 100.0 parts by weight.

With regard to the definition of the at least one natural source of calcium carbonate, at least one further pigment suitable for papermaking, at least one synthetic binder, at least one stearate salt, the optional at least one polysaccharide, the optional at least one thickener, the optional at least one dispersing agent and preferred embodiments thereof, reference is made to the statements provided above when discussing the technical details of the rotogravure printing medium of the present invention.

It is appreciated that the coating composition is preferably provided in liquid form.

Thus, the coating composition contains at least one aqueous solvent. The term "aqueous" solvent refers to a system, wherein the solvent comprises, preferably consists of, water. However, said term does not exclude that the solvent comprises minor amounts of at least one water-miscible organic solvent selected from the group comprising methanol, ethanol, acetone, acetonitrile, tetrahydrofuran and mixtures thereof. If the aqueous solvent of the coating composition comprises at least one water-miscible organic solvent, the aqueous solvent comprises the at least one water-miscible organic solvent in an amount of from 0.1 to 40.0 wt.-% preferably from 0.1 to 30.0 wt.-%, more preferably from 0.1 to 20.0 wt.-% and most preferably from 0.1 to 10.0 wt.-%, based on the total weight of the solvent. For example, the aqueous solvent of the coating composition consists of water. If the aqueous solvent of the coating composition consists of water, the water to be used can be any water available such as tap water and/or deionised water.

According to one embodiment, the coating composition is prepared using an aqueous suspension of the at least one natural source of calcium carbonate having a solid content of from 10.0 wt.-% to 82.0 wt.-%, preferably from 50.0 wt.-% to 81.0 wt.-%, and most preferably from 50.0 wt.-% to 78.0 wt.-%, based on the total weight of the aqueous suspension of the at least one natural source of calcium carbonate. For example, the coating composition is prepared using an aqueous suspension of the at least one natural source of calcium carbonate having a solid content of from 65.0 wt.-% and 78.0 wt.-%, based on the total weight of the aqueous suspension of the at least one natural source of calcium carbonate.

Alternatively, the coating composition is prepared by using the at least one natural source of calcium carbonate in dry form.

It is appreciated that the coating composition for rotogravure printing media preferably has a solid content from 10.0 to 80.0 wt.-%, preferably from 30.0 to 75.0 wt.-%, more preferably from 40.0 to 70.0 wt.-%, and most preferably from 45.0 to 65.0 wt.-%, based on the total weight of the coating composition.

The coating composition for rotogravure printing media preferably has a Brookfield viscosity in the range of 20 to 3 000 mPas, preferably from 250 to 3 000 mPas, and more preferably from 500 to 2 500 mPas.

In one embodiment the coating composition for rotogravure printing media preferably has a pH of from 7.0 to 10.0, more preferably a pH from 6.5 to 9.5 and most preferably a pH from 8.0 to 9.5. For example, the coating composition for rotogravure printing media has a pH of from 8.5 to 9.5 such as of about 9.0.

Manufacture of the Inventive Rotogravure Printing Medium

A method for producing a rotogravure printing medium is provided, the method comprising the steps of:
- a) providing a substrate having a first side and a reverse side, and
- b) applying a coating composition on at least the first side of the substrate to form a coating layer.

With regard to the definition of the substrate, the coating composition and preferred embodiments thereof, reference is made to the statements provided above when discussing the technical details of the rotogravure printing medium and the coating composition of the present invention.

The coating composition is preferably in liquid form. The inventive method thus preferably further comprises a step c) of drying the coating layer.

According to one embodiment, method step b) is carried out on the first side and the reverse side of the substrate to manufacture a print medium being coated on the first and the reverse side. This step may be carried out for each side separately or may be carried out on the first and the reverse side simultaneously. If method step b) is carried out on the first side and the reverse side of the substrate, method step c) is preferably also carried out on the reverse side of the substrate to manufacture a print medium being coated on the first and the reverse side. Method steps b) and c) may be carried out for each side separately or may be carried out on the first and the reverse side simultaneously.

According to one embodiment, step b) and/or step c) is/are carried out a second time or more times using a different or the same coating composition. For example, step b) and step c) are carried out a second time or more times using a different or the same coating composition. In one embodiment, steps b) and c) are carried out a second time or more times using a different coating composition.

The coating layer may be applied onto the substrate by conventional coating means commonly used in this art. Suitable coating methods are, e.g., air knife coating, electrostatic coating, metering size press such as by stiff blade or bent blade, film coating, spray coating, wound wire rod coating, slot coating, slide hopper coating, gravure, curtain coating, high speed coating and the like. Some of these methods allow for simultaneous coatings of two or more layers, which is preferred from a manufacturing economic perspective. However, any other coating method which would be suitable to form a coating layer on the substrate may also be used.

In one embodiment the coating composition is applied by high speed coating, metering size press such as by stiff blade or bent blade, curtain coating, spray coating or electrostatic coating. Preferably, high speed coating is used to apply the coating layer.

After coating, the rotogravure printing medium may be subjected to calendering or super-calendering to enhance surface smoothness. For example, calendering may be carried out at a temperature from 20 to 200° C., preferably from 60 to 100° C. using, for example, a calender having 2 to 12 nips, preferably 5 to 12 nips and most preferably 10 to 12 nips. Said nips may be hard or soft, hard nips, for example, can be made of a ceramic material.

In one embodiment, the rotogravure printing medium is calendered at a speed of up to 2 000 m/min, preferably from 300 to 1 700 m/min and most preferably from 500 to 1 500 m/min.

According to one exemplary embodiment, the rotogravure printing medium is calendered at 300 kN/m to obtain a glossy coating. According to another exemplary embodiment, the rotogravure printing medium is calendered at 120 kN/m to obtain a matt coating.

Preparation of Crumbles

The crumbles may be prepared by the specific sequence of process steps as defined herein. In this regard, the crumbles are prepared by the following steps of:
- a) providing at least one calcium carbonate-containing material in the form of an aqueous slurry having solids content in the range from 5.0 to 45.0 wt.-%, based on the total weight of the slurry,
- b) wet grinding the at least one calcium carbonate-containing material of step a) to obtain an aqueous slurry of the at least one wet-ground calcium carbonate-containing material, wherein the particles of the at least one wet-ground calcium carbonate-containing material have a
    - i) weight particle size $d_{75}$ of 0.7 to 3.0 μm,
    - ii) weight median particle size $d_{50}$ of 0.5 to 2.0 μm,
    - iii) weight particle size $d_{25}$ of 0.1 to 1.0 μm, as measured according to the sedimentation method, and
    - iv) a BET specific surface area of from 4.0 to 12.0 m$^2$/g, measured by the measured by nitrogen gas adsorption using the BET isotherm (ISO 9277:2010),
- c) mechanical dewatering of the aqueous slurry of step b) to obtain crumbles comprising the at least one calcium carbonate-containing material having solids content of 78.0 wt.-% to 90.0 wt.-%, based on the total weight of the crumbles.

It is appreciated that the at least one calcium carbonate-containing material of step a) is provided in the form of an aqueous slurry. In this respect, the at least one calcium carbonate-containing material provided in step a) may have any particle size distribution allowing the material to be subjected to a wet grinding step. Therefore, the at least one calcium carbonate-containing material may be provided as a comminuted material, for example, in crushed or preground form. Preferably, the at least one calcium carbonate-containing material of step a) is provided in a preground form.

According to one embodiment the at least one calcium carbonate-containing material of step a) is obtained by dry pregrinding. According to another embodiment of the present invention the at least one calcium carbonate-containing material of step a) is obtained by wet pregrinding and optional subsequent drying.

In general, the pregrinding step for obtaining the at least one calcium carbonate-containing material of step a) can be carried out with any conventional grinding device, for example, under conditions such that refinement predominantly results from impacts with a secondary body, i.e. in one or more of: a ball mill, a rod mill, a vibrating mill, a roll crusher, a centrifugal impact mill, a vertical bead mill, an attrition mill, a pin mill, a hammer mill, a pulveriser, a shredder, a de-clumper, a knife cutter, or other such equipment known to the skilled man. In case the at least one calcium carbonate-containing material provided in step a) comprises a wet preground calcium carbonate-containing material, the pregrinding step may be performed under conditions such that autogenous grinding takes place and/or by horizontal ball milling, and/or other such processes known to the skilled man. The wet processed preground calcium carbonate-containing material thus obtained may be washed and dewatered by well known processes, e.g. by flocculation, filtration or forced evaporation prior to drying. The subsequent step of drying may be carried out in a single step such as spray drying, or in at least two steps. It is also common that such a calcium carbonate-containing material undergoes a beneficiation step, such as a flotation, bleaching or magnetic separation step, to remove impurities.

According to one embodiment, the at least one calcium carbonate-containing material provided in step a) has a weight median particle size $d_{50}$ ranging from 0.1 to 200.0 μm, preferably from 0.2 to 100.0 μm, and more preferably from 0.5 to 50.0 μm, as measured by the sedimentation method.

The aqueous slurry of the at least one calcium carbonate-containing material has solids content of from 5.0 wt.-% to 45.0 wt.-%, preferably from 10.0 wt.-% to 45.0 wt.-%, more preferably from 15.0 wt.-% to 45.0 wt.-% and most preferably from 20.0 wt.-% to 45.0 wt.-%, based on the total weight of the aqueous slurry. For example, the aqueous slurry of the at least one calcium carbonate-containing material provided in step a) has solids content of from 18.0 wt.-% to 45.0 wt.-% or from 30.0 wt.-% to 45.0 wt.-%, based on the total weight of the aqueous slurry.

An aqueous "slurry" or "suspension" in the meaning of the present invention comprises insoluble solids and water and usually may contain large amounts of solids and, thus, can be more viscous and generally of higher density than the liquid from which it is formed.

The term "aqueous" slurry or suspension refers to a system, wherein the liquid phase comprises, preferably consists of, water. However, said term does not exclude that the liquid phase of the aqueous slurry comprises minor amounts of at least one water-miscible organic solvent selected from the group comprising methanol, ethanol, acetone, acetonitrile, tetrahydrofuran and mixtures thereof. If the aqueous slurry comprises at least one water-miscible organic solvent, the liquid phase of the aqueous slurry comprises the at least one water-miscible organic solvent in an amount of from 0.1 to 40.0 wt.-% preferably from 0.1 to 30.0 wt.-%, more preferably from 0.1 to 20.0 wt.-% and most preferably from 0.1 to 10.0 wt.-%, based on the total weight of the liquid phase of the aqueous slurry. For example, the liquid phase of the aqueous slurry consists of water.

The water to be used for preparing the aqueous slurry of step a) is tap water, deionized water, process water or rain water, or a mixture thereof. Preferably, the water used for preparing the aqueous slurry of step a) is tap water.

It is preferred that the aqueous slurry of the at least one calcium carbonate-containing material provided in step a) is free of dispersing agents.

According to step b) of the process according to the present invention, the at least one calcium carbonate-containing material of step a) is wet ground to obtain an aqueous slurry of the at least one wet-ground calcium carbonate-containing material such that the particles of the at least one wet-ground calcium carbonate-containing material have a
  i) weight particle size $d_{75}$ of 0.7 to 3.0 μm,
  ii) weight median particle size $d_{50}$ of 0.5 to 2.0 μm,
  iii) weight particle size $d_{25}$ of 0.1 to 1.0 μm, as measured according to the sedimentation method, and
  iv) a BET specific surface area of from 4.0 to 12.0 m²/g, measured by nitrogen gas adsorption using the BET isotherm (ISO 9277:2010).

It is appreciated that process step b) is preferably carried out in at least one grinding unit to obtain the wet ground calcium carbonate-containing material.

The term "wet grinding" in the meaning of the process according to the present invention refers to the comminution (e.g., in a ball mill) of solid material (e.g., of mineral origin) in the presence of water meaning that said material is in form of an aqueous slurry or suspension.

For the purposes of the present invention, any suitable mill known in the art may be used. However, process step b) is preferably carried out in a vertical or horizontal ball mill, more preferably a horizontal ball mill. Such vertical and horizontal ball mills usually consist of a vertically or horizontally arranged, cylindrical grinding chamber comprising an axially fast rotating agitator shaft being equipped with a plurality of paddles and/or stirring discs, such as described for example in EP 0607840 A1.

It is to be noted that process step b) is carried out by using at least one grinding unit, i.e. it is also possible to use a series of grinding units which may, for example, be selected from ball mills such as vertical or horizontal ball mills.

The amount of water being present during process step b) may be expressed by the total moisture content which is based on the total weight of said slurry. The process according to the present invention is characterized in that the grinding step is carried out at low solids contents, i.e. at high total moisture contents, for example at a total moisture content ranging from 65.0 to 90.0 wt.-%, based on the total weight of said slurry. According to one embodiment, the total moisture content during process step b) ranges from 70.0 to 88.0 wt.-%, preferably from 73.0 to 86.0 wt.-%, and more preferably from 74.0 to 85.0 wt.-%, based on the total weight of the slurry.

Thus, it is appreciated that the aqueous slurry of the at least one wet-ground calcium carbonate-containing material during process step b) has solids content in the range from 10.0 to 35.0 wt.-%, preferably from 12.0 to 30.0 wt.-%, more preferably from 14.0 to 27.0 wt.-% and most preferably from 15.0 to 26.0 wt.-%, based on the total weight of the slurry.

Thus, it is appreciated that process step b) is carried out in that the aqueous slurry of the at least one wet-ground calcium carbonate-containing material provided in step a) is further diluted with water to the desired solids content during process step b).

Accordingly, the aqueous slurry of the at least one wet-ground calcium carbonate-containing material obtained in step b) has lower solids content than the aqueous slurry of the at least one calcium carbonate-containing material provided in step a).

Thus, the aqueous slurry of the at least one wet-ground calcium carbonate-containing material obtained in process step b) has solids content in the range from 10.0 to 35.0 wt.-%, preferably from 12.0 to 30.0 wt.-%, more preferably from 14.0 to 27.0 wt.-% and most preferably from 15.0 to 26.0 wt.-%, based on the total weight of the slurry.

In one embodiment of the present process, step b) is carried out in the presence of at least one further particulate filler material.

If process step b) is carried out in the presence of at least one further particulate filler material, the at least one further particulate filler material is preferably selected from the group comprising precipitated calcium carbonate (PCC), metal oxides such as titanium dioxide and/or aluminium trioxide, metal hydroxides such as aluminium tri-hydroxide, metal salts such as sulfates, silicates such as talc and/or kaolin and/or kaolin clay and/or mica, carbonates such as magnesium carbonate and/or gypsum, satin white and mixtures thereof.

Thus, if process step b) is carried out in the presence of at least one further particulate filler material, the aqueous slurry of the at least one calcium carbonate-containing material provided in step a) further comprises the at least one further particulate filler material. It is to be noted that the aqueous slurry of the at least one wet-ground calcium carbonate-containing material and the at least one further particulate filler material during process step b) has solids content in the range from 10.0 to 35.0 wt.-%, preferably from 12.0 to 30.0 wt.-%, more preferably from 14.0 to 27.0 wt.-% and most preferably from 15.0 to 26.0 wt.-%, based on the total weight of the slurry. Accordingly, the aqueous slurry of the at least one wet-ground calcium carbonate-containing material and the at least one further particulate filler material obtained in process step b) has solids content in the range from 10.0 to 35.0 wt.-%, preferably from 12.0 to 30.0 wt.-%, more preferably from 14.0 to 27.0 wt.-% and most preferably from 15.0 to 26.0 wt.-%, based on the total weight of the slurry.

It is to be noted that process step b) is carried out such that a wet-ground material having the particle size distribution as defined for the crumbles comprising the at least one calcium carbonate-containing material is obtained. Thus, it is appreciated that process step b) is carried out such that the weight median particle size $d_{50}$ of the at least one wet-ground calcium carbonate-containing material obtained in step b) is decreased compared to the at least one calcium carbonate-containing material provided in step a). Accordingly, the at least one wet-ground calcium carbonate-containing material obtained in step b) has a i) weight particle size $d_{75}$ of 0.7 to 3.0 μm, ii) weight median particle size $d_{50}$ of 0.5 to 2.0 μm, and weight particle size $d_{25}$ of 0.1 to 1.0 μm, as measured according to the sedimentation method.

Additionally, process step b) is carried out such that a wet-ground material having the BET specific surface area as defined for the crumbles comprising the at least one calcium carbonate-containing material is obtained. Thus, it is appreciated that process step b) is carried out in that the BET specific surface area of the at least one wet ground calcium carbonate-containing material obtained in step b) is decreased compared to the at least one calcium carbonate-containing material provided in step a). Accordingly, the at least one wet-ground calcium carbonate-containing material obtained in step b) has a BET specific surface area of from 4.0 to 12.0 m$^2$/g, measured by nitrogen gas adsorption using the BET isotherm (ISO 9277:2010).

It is preferred that process step b) is carried out in the absence of dispersing agents. Thus, the aqueous slurry obtained in process step b) is preferably free of dispersing agents.

Wet grinding step b) is preferably carried out at a starting temperature which is of about room temperature or of elevated temperature. For the purposes of the process according to the present invention, a temperature ranging from 15° C. to 85° C. is particularly suitable as starting temperature.

According to another embodiment, the starting temperature in step b) ranges from 15° C. to 60° C., preferably from 20° C. to 50° C. and most preferably from 20° C. to 40° C.

During wet grinding step b), the temperature is allowed to rise above the starting temperature of process step b). For example, the temperature in step b) may rise to a temperature of up to 100° C.

It is a further requirement of the instant process that the aqueous slurry obtained in process step b) is subjected to a mechanical dewatering in process step c) such as to obtain crumbles comprising the at least one calcium carbonate-containing material having solids content of 78.0 wt.-% to 90.0 wt.-%, based on the total weight of the crumbles.

Such mechanical dewatering may be undertaken by all the techniques and methods well known to the man skilled in the art for reducing the water content of an aqueous slurry comprising at least one wet-ground calcium carbonate-containing material to solids content of 78.0 wt.-% to 90.0 wt.-%, based on the total weight of the obtained crumbles. The mechanical dewatering in process step c) is preferably carried out in a vertical plate pressure filter, a tube press or a vacuum filter. More preferably, process step c) is carried out in a tube press.

A tube press is a membrane type filter press and capable of operating at high filtration pressures up to 150.0 bar. Preferably, process step c) is carried out under pressure, even more preferably a pressure from 20.0 bar to 140.0 bar, more preferably from 65.0 bar to 120.0 bar and most preferably from 80.0 to 110.0 bar.

The use of these high pressures enables a higher degree of separation of the liquid and solid phases. The principles of operation of a tube press are as follows:

The filtration takes place between two concentric cylinders. The outer cylinder is the casing, and the inner, the candle. The process slurry is pumped into the annular space between the filter medium and the bladder. Hydraulic fluid, usually water, is then pumped between the bladder and the casing putting the slurry under pressure and causing filtration to take place. When filtration is complete the hydraulic fluid is withdrawn from the tube unit using vacuum until the bladder is dilated against the casing. The candle is then lowered to the discharge position and a pulse of air is blown between the candle and the filter medium. This causes the filter cloth to expand, fracturing the cake which is discharged under gravity. When complete the candle closes to the slurry fill position to repeat the cycle.

The starting temperature of the mechanical dewatering of process step c) is preferably in the range of 15 to 80° C., preferably at a starting temperature in the range of 20 to 70° C., and more preferably at a starting temperature in the range of 30 to 60° C. For example, the starting temperature of the mechanical dewatering of process step c) is about 50° C.

The temperature during the mechanical dewatering of process step c) is preferably in the range of 15 to 80° C., preferably in the range of 20 to 70° C., and more preferably in the range of 30 to 60° C. For example, the temperature during the mechanical dewatering of process step c) is about 50° C.

It is one requirement of the instant invention that process step c) is carried out such that crumbles comprising the at least one calcium carbonate-containing material are obtained. The crumbles thus have solids content of 78.0 wt.-% to 90.0 wt.-% and preferably from 80.0 wt.-% to 88.0 wt.-%, based on the total weight of the crumbles.

In one embodiment of the instant process, the aqueous slurry of the at least one wet-ground calcium carbonate-containing material obtained in step b) is partially dewatered to solids content in the range from 20.0 to 40.0 wt.-%, based on the total weight of the slurry, before process step c) is carried out.

Such optional dewatering may be undertaken by all the techniques and methods well known to the man skilled in the art for reducing the water content of an aqueous slurry comprising at least one wet-ground calcium carbonate-containing material to the desired solids content. The optional dewatering before process step c) can be preferably carried out mechanically or thermally such as by filtration, centrifugation, sedimentation in a settling tank, evaporation etc., preferably by centrifugation or settling.

It is preferred that process step c) is carried out in the absence of dispersing agents. Thus, the crumbles comprising the at least one calcium carbonate-containing material obtained in process step c) are preferably free of dispersing agents.

The process according to the present invention may further comprise drying step $d_1$) (also referred to as "drying step"). In said drying step, the crumbles obtained in step c) are dried to obtain dried crumbles.

In general, the drying step according to the process according to the present invention may be carried out by any drying method known to the skilled person for drying materials having solids content from 78.0 to 90.0 wt.-%, based on the total weight of the material.

According to one embodiment, drying step $d_1$) is carried out in a cell mill as known by the skilled person. Preferably said drying step is carried out at a temperature ranging from 90° C. to 130° C. and preferably from 100° C. to 120° C.

By means of drying step $d_1$), dried crumbles are obtained having a low total moisture content which is less than or equal to 3.0 wt.-%, based on the total weight of said dried crumbles.

Thus, it is appreciated that the crumbles comprising the at least one calcium carbonate-containing material obtained in optional drying step $d_1$) have solids content of ≥97.0 wt.-%, preferably from 97.0 to 99.98 wt.-% and most preferably from 97.0 to 99.98 wt.-%, based on the total weight of the crumbles.

In one embodiment of the present invention, the process according to the present invention for the preparation of crumbles comprising at least one calcium carbonate-containing material further comprises a process step $d_2$) of treating the crumbles obtained in step c) with a hydrophobizing agent (also referred to as "treatment step") in order to obtain surface-treated crumbles. By means of said treatment step, a treatment layer comprising the hydrophobizing agent is formed on at least a part of the accessible surface area of the calcium carbonate-containing material particles.

The hydrophobizing agent used in treatment step $d_2$) may be any agent known to the skilled person which is capable to form a hydrophobic treatment layer on at least a part of the accessible surface area of the calcium carbonate-containing material particles.

In one embodiment, the hydrophobizing agent in treatment step $d_2$) is an aliphatic carboxylic acid having a total amount of carbon atoms from C4 to C24 and/or at least one mono-substituted succinic anhydride consisting of succinic anhydride mono-substituted with a group selected from a linear, branched, aliphatic and cyclic group having a total amount of carbon atoms from C2 to C30 in the substituent and/or a phosphoric acid ester blend of one or more phosphoric acid mono-ester and one or more phosphoric acid di-ester.

With regard to the definition of the aliphatic carboxylic acid having a total amount of carbon atoms from C4 to C24, the at least one mono-substituted succinic anhydride consisting of succinic anhydride mono-substituted with a group selected from a linear, branched, aliphatic and cyclic group having a total amount of carbon atoms from C2 to C30 in the substituent, the phosphoric acid ester blend of one or more phosphoric acid mono-ester and one or more phosphoric acid di-ester and preferred embodiments thereof, reference is made to the statements provided above when discussing the technical details of the crumbles of the present invention.

In one embodiment of the process according to the present invention, the temperature in treatment step $d_2$) ranges from 70° C. to 140° C., preferably from 75° C. to 130° C., and more preferably from 80° C. to 125° C.

In one embodiment, the treatment step may be carried out directly after mechanical dewatering step c) or, if present, after drying step $d_1$) or before use.

In another embodiment drying step $d_1$) and treatment step $d_2$) are carried out simultaneously, this means the hydrophibizing agent is added during/or before step $d_1$). This embodiment is in particular preferred for film applications, like blown films or breathable films, or for polyvinyl chloride applications of the obtained crumbles.

The surface-treated crumbles obtained after treatment step $d_2$) preferably have a low total moisture content. Therefore, according to one embodiment, said surface-treated crumbles have a total moisture content of less than or equal to 3.0 wt.-%, based on the total weight of said crumbles.

Thus, it is appreciated that the crumbles comprising the at least one calcium carbonate-containing material obtained in optional treatment step $d_2$) have solids content of ≥97.0 wt.-%, preferably from 97.0 to 99.97 wt.-% and most preferably from 98.0 to 99.97 wt.-%, based on the total weight of the crumbles.

Additionally or alternatively, the process according to the present invention for the preparation of crumbles comprising at least one calcium carbonate-containing material further comprises a process step $d_3$) of treating the crumbles obtained in step c) with a dispersing agent (also referred to as "dispersing step") in order to obtain dispersed crumbles.

Such dispersing step $d_3$) can be carried out by the use of common dispersing agents. Preferred dispersing agents are polyacrylate-based dispersants like a salt of a polyacrylate. The dispersing agent is preferably selected from the group consisting of an acrylic polymer, an acrylic and a vinylic copolymer and mixtures thereof. Dispersing agents such as acrylic polymers, acrylic and vinylic copolymers or mixtures thereof having multiple acidic sites can be partially or totally neutralised. In one embodiment, the dispersing agent which may be used in dispersing step d) is partially or completely neutralized, preferably to a degree of 5.0% to 100.0%, more preferably to a degree of 25.0% to 100.0% and most preferably to a degree of 75.0% to 100.0% using a neutralizing agent containing ions of alkali metals and/or alkaline earth metals. For example, the acidic sites of the dispersing agent are neutralized using a neutralizing agent containing only sodium. Alternatively, the acidic sites of the dispersing agent are neutralized using a neutralizing agent containing only potassium. In one embodiment, the acidic sites of the dispersing agent are neutralized using a neutralizing agent containing a mixture of sodium and potassium.

Dispersing step $d_3$) can be performed by the use of any suitable means, and is preferably conducted by the use of a high sheer disperser.

For example, dispersing step $d_3$) is carried out in that an aqueous slurry of the crumbles comprising the at least one calcium carbonate-containing material is formed by suspending the crumbles obtained in process step c) and a dispersing agent in water.

According to one embodiment, the aqueous slurry of dispersed crumbles obtained in dispersing step $d_3$) has solids content of from 10.0 wt.-% to 82.0 wt.-%, preferably from 50.0 wt.-% to 81.0 wt.-%, and most preferably from 50.0 wt.-% to 78.0 wt.-%, based on the total weight of the aqueous slurry.

The scope and interest of the invention will be better understood based on the following figures and examples which are intended to illustrate certain embodiments of the invention and are non-limitative.

EXAMPLES

1. Measurement Methods

In the following, materials and measurement methods implemented in the examples are described.

Particle Size Distribution (Mass % Particles with a Diameter <X) and Weight Median Diameter ($d_{50}$) of a Particulate Material Weight grain diameter and grain diameter mass distribution of a particulate material were determined via the sedimentation method, i.e. an analysis of sedimentation behaviour in a gravitational field. The measurement was made with a Sedigraph™ 5120 or a Sedigraph™ 5100 of Micromeritics Instrument Corporation.

The method and the instrument are known to the skilled person and are commonly used to determine grain size of fillers and pigments. The measurement is carried out in an aqueous solution of 0.1 wt % $Na_4P_2O_7$. The samples are dispersed using a high speed stirrer and supersonics.

BET Specific Surface Area of a Material

Throughout the present document, the specific surface area (in $m^2/g$) of a particulate material was determined using the BET method (using nitrogen as adsorbing gas), which is well known to the skilled man (ISO 9277:1995). The total surface area (in $m^2$) of the particulate material is then obtained by multiplication of the specific surface area and the mass (in g) of the particulate material. The method and the instrument are known to the skilled person and are commonly used to determine the specific surface of particulate materials.

Solids Content of an Aqueous Suspension

The suspension solids content (also known as "dry weight") was determined using a Moisture Analyser HR73 from the company Mettler-Toledo, Switzerland, with the following settings: temperature of 120° C., automatic switch off 3, standard drying, 5 to 20 g of suspension.

Calcium Carbonate Content of a Particulate Material

For the measurement of the calcium carbonate content of a particulate material, about 10.000 grams of the dry sample (dried at 110° C. for 5 hours in an oven) were weighed in a flask/beaker and a small amount of demineralized water was added. Then, 40 mL of hydrochloric acid (25% p.a.) were added to the respective sample and after the $CO_2$ development stopped, the mixture was boiled for about 5 min. After cooling down, the mixture was filtered through a 0.8 μm cellulose-acetate filter and washed thoroughly. Then the filtrate was quantitatively rinsed to a volumetric flask with distilled water and filled up to 1000.0 ml at 20° C.

The thus obtained filtrate was then slowly titrated by pipetting 10.00 mL of the obtained filtrate (about 20° C.) into a Memotitrator-beaker and 1.0 g (+0.2 g) of triethanolamine puris. and 3.0 g of $MgSO_4 \times 7H_2O$. The mixture was diluted with demineralized water up to 70 mL and then, just before the titration, 10.0 mL of 2N sodium hydroxide and 7 to 9 drops of a HHSNN-methanol solution (0.2 wt.-% of HHSNN in methanol) were added to the mixture. After the pre-dosing, the titrator stirred the mixture for 60 s and then the phototrode voltage was set to 900 to 1150 mV during titration. The calcium carbonate content was displayed in percent.

Moisture Content

The moisture content of the particulate material was determined by thermogravimetric analysis (TGA). TGA analytical methods provide information regarding losses of mass with great accuracy, and is common knowledge; it is, for example, described in "Principles of Instrumental analysis", fifth edition, Skoog, Holler, Nieman, 1998 (first edition 1992) in Chapter 31 pages 798 to 800, and in many other commonly known reference works. In the present invention, thermogravimetric analysis (TGA) is performed using a Mettler Toledo TGA 851 based on a sample of 500+/−50 mg and scanning temperatures from 25° C. to 350° C. at a rate of 20° C./minute under an air flow of 70 ml/min.

Alternatively, the moisture content of the particles was determined by the oven method.

Brookfield Viscosity

The Brookfield-viscosity of a slurry was determined with a Brookfield Viscometer type RVT equipped with a LV-4 spindle at a speed of 100 rpm or 20 rpm and room temperature (23.5±1° C.).

pH Measurement

The pH was measured at 25° C. using a Mettler Toledo Seven Easy pH meter and a Mettler Toledo InLab® Expert Pro pH electrode. A three point calibration (according to the segment method) of the instrument was first made using commercially available buffer solutions having pH values of 4, 7 and 10 at 20° C. (from Aldrich). The reported pH values were the endpoint values detected by the instrument (the endpoint was when the measured signal differs by less than 0.1 mV from the average over the last 6 seconds).

Optical Print Density

Optical print density was measured using a SpectroDens spectrometer from Techkon GmbH, Germany, according to DIN 16527-3:1993-11. The deviation of the instrument is +0.2 points. The measuring was carried out with and without electrostatic assist (ESA).

Moisture Pick-Up Susceptibility

The term "moisture pick up susceptibility" in the meaning of the present invention refers to the amount of moisture absorbed on the surface of the calcium carbonate-containing particles and is determined in mg moisture/g of the dry crumbles after exposure to an atmosphere of 50% of relative humidity for 48 hours at a temperature of 23° C.

Pigment Whiteness, Aper Opacity, Light Scattering and CIELAB

Pigment whiteness R457 (or brightness), paper opacity and light scattering were measured using an ELREPHO 3000 from the company Datacolor according to ISO 2469: 1994 (DIN 53145-2:2000 and DIN 53146:2000). The opacity and scattering were typically measured on the felt side (FS). The CIELAB L*, a*, b* coordinates were measured using an ELREPHO 3000 from the company Datacolor according to EN ISO 11664-4 and barium sulfate as standard.

Paper Gloss

Paper and print gloss were measured using LGDL-05.3-lab instrumentation from the company Lehmann Messsysteme GmbH, DE-Koblenz according to EN ISO 8254-1: 2003, TAPPI 75° (%).

Roughness PPS

Paper roughness is measured using the PPS roughness tester from the company Lorentzen & Wettre to DIN ISO 8791-4 with a pressure of 1.0 mPa using soft component, PPS 1.0 (μm).

Missing Dots Analysis

The missing dots analysis was carried out by using a verity instrument of Verity IA, USA. The settings for the missing dots analysis were as described in the following table 1.

TABLE 1

| Settings | |
| --- | --- |
| Measured area: | 20 mm × 20 mm |
| Threshold: | 19 |
| Color separation: | Blue |
| Dot sphericity minimum: | 12.56* |
| Dot sphericity maximum: | 10 000# |
| Average brightness: | 0-255 |
| Filter min: | 0.01 mm² |
| Filter max: | 0.5 mm² |
| Erosion: | 0 |
| Dilation: | 2 |
| No objective AOI (side objects are not measured) | |

*refers to the sphericity of a perfectly round-shaped circle;
refers to the sphericity of a thin and long fiber The software "Profbau Verity Print Target Version 4" was used to analyze the paper coating.

Evaluation of the Print Quality on Test Substrates

The following method was used to determine and quantify the print quality in rotogravure printing. The method can be divided into four steps, which are carried out successively.

1. Digitization of a Printed Area

A scanner was used to digitize areas of 500×500 pixel by applying a resolution of 1 200. The obtained images (five for each sample) were saved as jpeg files without data compression.

2. Image Preparation

The obtained images were used to determine the number of printing dots in the chosen sample area as well as the area covered by the printing dots. For the analysis the obtained images in the form of RGB color prints were thus converted into grey scale images by using the free software IrfanView. The newly generated images were further analyzed with the free software GNU Octave.

3. Image Analysis

The free software GNU Octave was used to analyze the newly generated images. Said software handles images as matrices and allows simple manipulations of these images. The printing dots were separated by a specific threshold level, which is calculated for each image separately. The threshold level is defined as the level at which the highest number of detected area containing more than 1 pixel is determined. An algorithm to find the threshold level was developed, and is shown in the following:

```
% Starting the function
function missingdot;
%Looking for files in a given directory
dirlist=dir(pwd);
%Define the results matrix
results=[ ];
%Work through all files in the directory
    for l=3:length(dirlist)-2
    % reading the image
    img=imread(dirlist(l).name);
    % converting the image to gray scale
    i2=rgb2gray(img);
    % defining an intermediate results vector do determine
    optimal threshold
    rv=[ ];
    %Starting a loop to check for the preferred threshold
        for i=1:255;
        %apply a threshold
        i3=im2bw(i2,i/255);
        % change black/white
        i4=~i3;
        %remove single and most probably wrong detected
        pixel i5=bwmorph(i4,"clean");
        % label the detected areas
        i6=bwlabel(i5);
        % create intermediate result (threshold, counts,
        area)     ri=[i,max(i6(:)),sum(i5(:))];
        %create intermediate results vector
        rv=[rv;ri];
    end
    % looking for the threshold level, given by the highest
    number of detected areas.
    [a,b]=max(rv(:,2));
    % creating output matrix
    results=[results;rv(b,:,:)];
end
%saving output matrix
save RESULTS.txt "results" "-ascii"
endfunction
```

This algorithm is started from a user interface (GUI Octave) and returns a text file (RESULTS.txt in the working directory) with complied results for further analysis.

4. Meaningful Preparation of Results

Excel was used to create tables of the single results. The highest number of printing dots as well as the highest area covered by the printing dots corresponds to the ideal image.

2. Examples

The following components were used to prepare the liquid coating compositions applied to the substrate.

Substrate 1: Paper with a basis weight (grammage) of 37.6 g/m², a thickness of 57 µm, opacity-FS of 83.3% and scattering-FS of 52.65 m²/kg, commercially available from Stora Enso Kabel GmbH & Co KG, Germany.

Substrate 2: Paper with a basis weight (grammage) of 39.1 g/m², a thickness of 60 µm, opacity-FS of 84.7% and scattering-FS of 53.67 m²/kg, commercially available from Stora Enso Kabel GmbH & Co KG, Germany.

Pigment 1: Calcium carbonate in crumbled form having a solids content of 85.0 wt.-%, based on the total weight of the crumbles, and in which 60 wt.-% of the particles are <1 µm and 90 wt.-% of the particles are <2 µm, as measured by the sedimentation method. The calcium carbonate particles of the crumbles have a $d_{50}$ of 0.8 µm, a $d_{98}$ of 2 to 7 µm and a BET specific surface area of 6 to 7 m²/g. The crumbles have a brightness >94, a yellowness index of <1.5, Cielab a* of ≈0, a Cielab b* of ≈0.4 and a Cielab L* of ≈97. The particles of the crumbles were surface treated by using 0.5 wt.-% stearic acid, based on the total weight of the crumbles.

Pigment 2: Kaolin, commercially available as Lustra® S from BASF, Germany.

Pigment 3: Talc, commercially available as Finntalc® C10 from Mondo Minerals, Finnland.

Binder: Acronal® S201 (acrylate copolymer), commercially available from BASF, Germany.

Thickener: Sterocoll® HT (acrylate copolymer), commercially available from BASF, Germany.

Stearate: Ombrelub® CD (calcium stearate), commercially available from Münzing Chemie GmbH, Germany.

Pigment 1 was obtained by wet grinding an aqueous slurry of calcium carbonate (marble; $d_{50}$=0.8 µm) having solids content of about 35.0 wt.-%, based on the total weight of the slurry. The slurry was wet ground in a vertical ball mill to a final particle size distribution as described above. The slurry obtained after wet grinding had solids content of about 20.0 wt.-%, based on the total weight of the slurry. The wet ground calcium carbonate-containing material was then dewatered by using a vertical tube press filter (Metso Corporation, Finland) operating at about 95 bars and a temperature of about 50° C. The pressure is reached by a hydraulic system. The obtained crumble particles were further surface-treated by using 0.5 wt.-% of stearic acid, based on the total weight of the crumbles.

The foregoing pigments were used to prepare four different liquid coating compositions (see Table 2) to demonstrate the invention.

TABLE 2

Composition of coating compositions

|  | Coating composition 1 (inventive) [pbw] | Coating composition 2 (inventive) [pbw] | Coating composition 3 (inventive) [pbw] | Coating composition 4 (reference) [pbw] |
| --- | --- | --- | --- | --- |
| Pigment 1 | 100 | 75 | 75 | 50 |
| Pigment 2 | — | 25 | — | 25 |
| Pigment 3 | — | — | 25 | 25 |
| Binder | 5 | 5 | 5 | 5 |
| Thickener | 0.1 | 0.1 | 0.2 | 0.2 |
| Stearate | 1 | 1 | 1 | 1 |
| pH | 9.0 | 9.0 | 9.0 | 9.0 |
| Viscosity [mPas] | 1 000-1 500 | 1 000-1 500 | 1 000-1 500 | 1 000-1 500 | pbw: parts by weight (d/d); coating compositions 1 to 4 further contained 0.4 parts by weight of a commercially available brightener.

The coating compositions 1 to 4 were prepared as aqueous slurries and have the properties as described in the following table 3.

TABLE 3

Properties of the coating compositions 1 to 4

|  | Coating composition 1 (inventive) | Coating composition 2 (inventive) | Coating composition 3 (inventive) | Coating composition 4 (reference) |
| --- | --- | --- | --- | --- |
| Pigment 1 | 100 | 75 | 75 | 50 |
| Pigment 2 | — | 25 | — | 25 |
| Pigment 3 | — | — | 25 | 25 |
| Time start [min] | 12.55 | 13.55 | 14.40 | 15.20 |
| Time end [min] | 13.40 | 14.30 | 15.05 | 15.50 |
| Solids content start [wt.-%] | 64.8 | 63.1 | 60.7 | 57.9 |
| Solids content end [wt.-%] | 63.7 | 63.0 | 60.5 | 58.1 |
| Viscosity 100 rpm start [mPas] | 810 | 930 | 620 | 510 |
| Viscosity 100 rpm end [mPas] | 720 | 960 | 640 | 460 |
| Viscosity 20 rpm start [mPas] | 2350 | 2680 | 1810 | 1240 |
| Viscosity 20 rpm end [mPas] | 2040 | 2760 | 1860 | 1350 |

As regards table 3, it is to be noted that even though the coating compositions 1 to 4 were prepared by the same amount of pigment (100 parts by weight), the solids content of the slurries varied depending on the pigment or pigment mixture from which the corresponding coating composition was prepared. In particular, it can be gathered that the pigment 1 gave a slurry with the highest solids content (coating compositions 1), while the reference pigment mixture of pigments 1, 2 and 3 gave a slurry with the lowest solids content (coating composition 4).

The liquid coating compositions 1 to 4 (as described in table 2) were single-coated with a metering system at the pilot coating machine at BASF's paper technical center in Ludwigshafen, Germany using a stiff blade (compositions 1 to 3) with an amount of 7.5 g/m² on the first side of the substrate and with an amount of 8.0 g/m² on the second side of the substrate (substrate 1 for coating composition 1 and 2; substrate 2 for coating composition 3 and 4). The solids content of each liquid coating composition was as high as possible as described in table 3. The coating layers were dried on the coating machine by IR and airfoils to end moisture content of 5.0 to 5.5%.

The obtained samples were then optionally calendered to a paper gloss target of 52% at a top and bottom temperature of 90° C., a speed of 300 m/min and a number of 11 nips.

The obtained paper samples were tested with regard to opacity, light scattering and roughness. The results are outlined in the following tables 4a and 4b for the uncalendered and calendered samples.

TABLE 4a

Paper characteristics for the uncalendered samples

|  | S 1 (sub* 1 + cc# 1) (inventive) | S 2 (sub* 1 + cc# 2) (inventive) | S 3 (sub* 2 + cc# 3) (inventive) | S 4 (sub 2* + cc# 4) (reference) |
| --- | --- | --- | --- | --- |
| Grammage [g/mm²] | 52.6 | 55 | 54.4 | 54.5 |
| Thickness [μm] | 59 | 62 | 63 | 64 |
| Density [g/cm³] | 0.89 | 0.89 | 0.87 | 0.86 |
| Opacity-FS [%] | 92.5 | 93.2 | 93.7 | 93.6 |
| Scattering-FS [m²/kg] | 78.13 | 76.32 | 80.33 | 77.05 |
| Roughness-FS [μm] | 1.88 | 1.95 | 2.04 | 2.25 |

TABLE 4a-continued

Paper characteristics for the uncalendered samples

| | S 1 (sub* 1 + cc# 1) (inventive) | S 2 (sub* 1 + cc# 2) (inventive) | S 3 (sub* 2 + cc# 3) (inventive) | S 4 (sub 2* + cc# 4) (reference) |
|---|---|---|---|---|
| Roughness-WS [μm] | 2.18 | 2.21 | 2.45 | 2.76 |

*substrate;
coating composition

TABLE 4b paper characteristics for the calendered samples

| | S 1 (sub* 1 + cc# 1) (inventive) | S 2 (sub* 1 + cc# 2) (inventive) | S 3 (sub* 2 + cc# 3) (inventive) | S 4 (sub* 2 + cc# 4) (reference) |
|---|---|---|---|---|
| Grammage [g/mm$^2$] | 53.6 | 54.6 | 53.8 | 54.1 |
| Thickness [μm] | 49 | 50 | 49 | 49 |
| Density [g/cm$^3$] | 1.09 | 1.09 | 1.1 | 1.1 |
| Opacity-FS [%] | 91 | 91.3 | 91.2 | 91.2 |
| Scattering-FS [m$^2$/kg] | 63.96 | 62.44 | 61.66 | 59.51 |
| Roughness-FS [μm] | 0.82 | 0.83 | 0.8 | 0.81 |
| Roughness-WS [μm] | 0.88 | 0.84 | 0.84 | 0.84 |

*substrate;
coating composition

It can be gathered from tables 4a and 4b that the calendered as well as uncalendered samples comprising pigment 1 in the coating layer obtain the highest light scattering, while the calendered as well as uncalendered samples comprising the reference pigment mixture of pigments 1, 2 and 3 gave lower light scattering. Furthermore, it can be gathered that the calendered as well as uncalendered samples comprising pigment 1 in the coating layer have well balanced optical and mechanical properties.

The effect of the coating compositions 1 to 4 on the optical density of black and color of a calendered coated paper product prepared therefrom is outlined in FIGS. 1 to 4. From FIGS. 1 to 4 it can be concluded that the coating compositions 1 to 3 gave sufficient results for black as well as colour inks. It has thus to be assumed that the coating compositions 1 to 3 impart positive effects on the optical and mechanical properties of paper end products comprising a coating layer prepared from such coating compositions.

Figure 5:
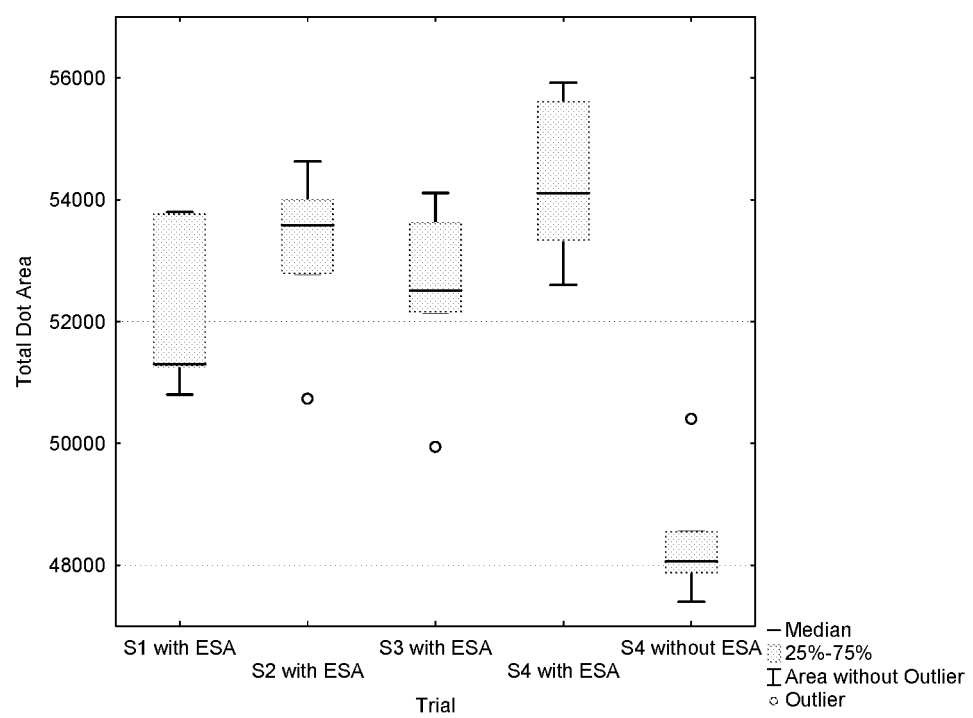
FIG. 5: The effect of coating composition 1 to 4 on missing dots of a coated paper product.
Figure 6:
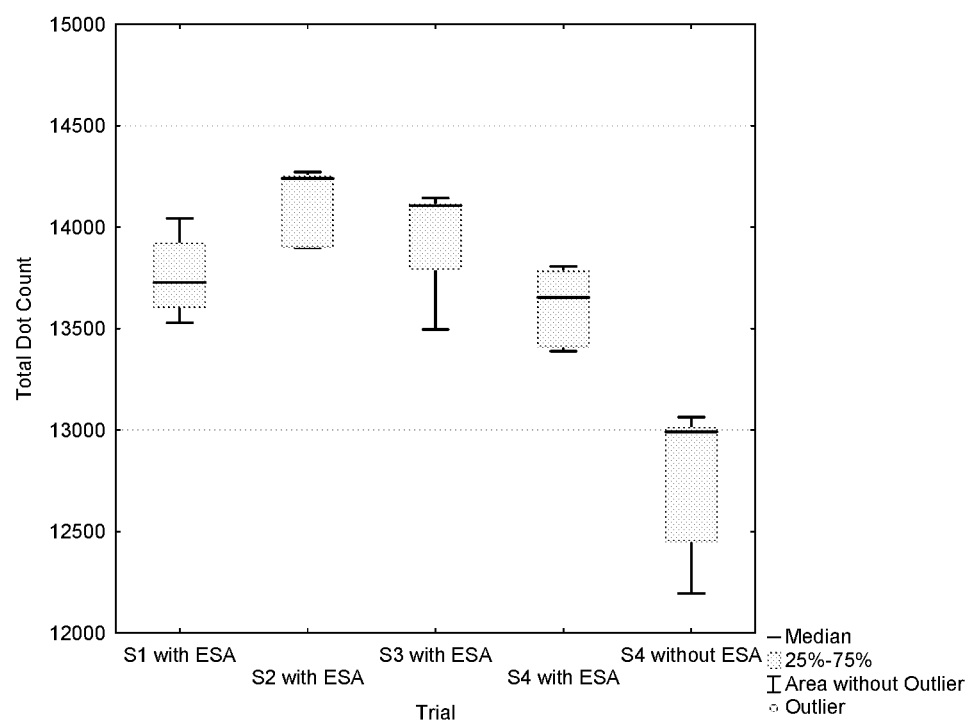
FIG. 6: The effect of coating composition 1 to 4 on dot area of a coated paper product.

The biggest issue with the print quality when coated with prior art compositions is the appearance of missing dots and the insufficient dot area. The effect of the coating compositions on missing dots and dot area of a coated paper product prepared from the coating compositions 1 to 4 are outlined in FIGS. 5 and 6. From FIGS. 5 and 6 it can be clearly gathered that the coating compositions 1 to 3 gave sufficient results as regards the dot area and the trial points for the missing dots. Thus, it has to be assumed that coating compositions 1 to 3 impart positive effects on the optical and mechanical properties of paper end products comprising a coating layer prepared from such coating compositions.

The invention claimed is:
1. A rotogravure printing medium comprising:
a) a substrate having a first side and a reverse side, and
b) a coating layer being in contact with at least the first side of the substrate, wherein the coating layer consists of:
i) >50.0 to 100.0 parts by weight of at least one natural source of calcium carbonate comprising particles consisting of calcium carbonate in an amount of >50.0 wt %, based on the total dry weight of the natural source of calcium carbonate, the at least one natural source of calcium carbonate comprises particles having a BET specific surface area of from 4.0 to 12.0 m$^2$/g, measured by the BET nitrogen method, wherein the at least one natural source of calcium carbonate is in the form of crumbles comprising dolomite and/or at least one natural ground calcium carbonate (NGCC),
ii) 0.0 to <50.0 parts by weight of at least one further pigment suitable for papermaking,
iii) 3.0 to 6.0 parts by weight of at least one synthetic binder,
iv) 0.1 to 0.5 parts by weight of at least one stearate salt,
v) optionally 1.0 to 1.5 parts by weight of at least one polysaccharide,
vi) optionally 0.1 to 0.5 parts by weight of at least one thickener, and
vii) optionally 0.2 to 3.0 parts by weight of at least one dispersing agent,
wherein the sum of the at least one natural source of calcium carbonate and the at least one further pigment in the coating layer is 100.0 parts by weight;
wherein the crumbles are a material being composed of a plurality of particles comprising the at least one source of calcium carbonate and moisture, said crumbles obtained by a process comprising the following steps:

a) providing at least one calcium carbonate-containing material in the form of an aqueous slurry having solids content in the range from 5.0 to 45.0 wt.-%, based on the total weight of the slurry,
b) wet grinding the at least one calcium carbonate-containing material of step a) to obtain an aqueous slurry of at least one wet-ground calcium carbonate containing material, wherein the particles of the at least one wet-ground calcium carbonate-containing material have a
   i) weight particle size $d_{75}$ of 0.7 to 3.0 μm,
   ii) weight median particle size $d_{50}$ of 0.5 to 2.0 μm,
   iii) weight particle size $d_{25}$ of 0.1 to 1.0 μm, as measured according to the sedimentation method, and
   iv) a BET specific surface area of from 4.0 to 12.0 m$^2$/g, measured by the measured by nitrogen gas adsorption using the BET isotherm (ISO 9277:2010), and
c) mechanical dewatering of the aqueous slurry of step b) to obtain crumbles comprising the at least one calcium carbonate-containing material having solids content of 78.0 wt.-% to 90.0 wt.-%, based on the total weight of the crumbles.

2. The rotogravure printing medium according to claim 1, wherein the substrate is selected from the group consisting of paper, cardboard, containerboard, plastic, cellophane, textile, wood, metal, and concrete.

3. The rotogravure printing medium according to claim 1, wherein the substrate is paper, cardboard, or containerboard.

4. The rotogravure printing medium according to claim 1, wherein the at least one natural ground calcium carbonate (NGCC) is selected from the group consisting of marble, chalk, limestone, and mixtures thereof.

5. The rotogravure printing medium according to claim 1, wherein the crumbles further comprise particles:
a) having a BET specific surface area of from 5.0 to 10.0 m$^2$/g, measured by the BET nitrogen method, and/or
b) having a weight median particle size $d_{50}$ of <2.5 μm, or
c) having a
   i) weight particle size $d_{75}$ of 0.7 to 3.0 μm,
   ii) weight median particle size $d_{50}$ of 0.5 to 2.0 μm, and/or
   iii) weight particle size $d_{25}$ of 0.1 to 1.0 μm, as measured according to the sedimentation method.

6. The rotogravure printing medium according to claim 1, wherein the crumbles comprise particles having a weight median particle size $d_{50}$ of from 0.1 to 2.5 μm, as measured according to the sedimentation method, and/or consisting of calcium carbonate in an amount of ≥90.0 wt.-%, based on the total dry weight of the natural source of calcium carbonate.

7. The rotogravure printing medium according to claim 1, wherein the crumbles comprise particles having a weight median particle size $d_{50}$ of from 0.1 to 2.0 μm, as measured according to the sedimentation method, and/or consisting of calcium carbonate in an amount of ≥95.0 wt.-%, based on the total dry weight of the natural source of calcium carbonate.

8. The rotogravure printing medium according to claim 1, wherein the crumbles comprises particles having a weight median particle size $d_{50}$ of from 0.2 to 1.5 μm, as measured according to the sedimentation method, and/or consisting of calcium carbonate in an amount of ≥97.0 wt.-%, based on the total dry weight of the natural source of calcium carbonate.

9. The rotogravure printing medium according to claim 1, wherein the crumbles have a moisture pick up susceptibility such that a total surface moisture level is ≤0.6 mg/g of the crumbles after exposure to an atmosphere of 50% of relative humidity for 48 hours at a temperature of 23° C., and/or a moisture content of from 0.2 wt.-% to 0.6 wt.-% based on the total dry weight of the crumbles.

10. The rotogravure printing medium according to claim 1, wherein:
a) the at least one further pigment suitable for papermaking is selected from the group consisting of precipitated calcium carbonate (PCC), metal oxides, titanium dioxide, aluminum trioxide, a metal hydroxide, aluminum tri-hydroxide, a metal salt, a sulfate, a silicate, talc, kaolin, kaolin clay, mica, a carbonate, a magnesium carbonate, gypsum, satin white, and any mixture thereof, and/or
b) the at least one synthetic binder is selected from the group consisting of polyvinylalcohol, styrene-butadiene latex, styrene-acrylate latex, styrene-acrylic acrylonitrile latex, polyvinyl acetate latex, and any mixture thereof, and/or
c) the at least one stearate salt is a stearate salt of a monovalent or divalent cation.

11. The rotogravure printing medium according to claim 1, wherein the at least one synthetic binder is selected from the group consisting of polyvinylalcohol, styrene-butadiene latex, styrene-acrylate latex, styrene-acrylic acrylonitrile latex, polyvinyl acetate latex, and any mixture thereof.

12. The rotogravure printing medium according to claim 1, wherein the at least one synthetic binder is a styrene-butadiene latex.

13. The rotogravure printing medium according to claim 1, wherein the at least one stearate salt is stearate salt of a monovalent or divalent cation selected from the group consisting of sodium stearate, potassium stearate, calcium stearate, magnesium stearate, strontium stearate, and any mixture thereof.

14. The rotogravure printing medium according to claim 1, wherein the at least one stearate salt is calcium stearate.

15. The rotogravure printing medium according to claim 1, wherein the coating layer comprises:
a) 51.0 to 100.0 parts by weight of the at least one natural source of calcium carbonate, and
b) 0.0 to 49.0 parts by weight of the at least one further pigment suitable for papermaking.

16. The rotogravure printing medium according to claim 1, wherein the at least one polysaccharide and/or the at least one thickener and/or the at least one dispersing agent is/are present in the coating layer.

17. The rotogravure printing medium according to claim 1, wherein:
a) the at least one polysaccharide is starch and/or guar, and/or
b) the at least one thickener is selected from the group consisting of a cellulosic derivative, ethylhydroxylethyl cellulose, carboxymethyl cellulose, an acrylic copolymer, and any mixture thereof, and/or
c) the at least one dispersing agent is a polyacrylate-based dispersing agent.

18. The rotogravure printing medium according to claim 1, wherein the coating layer has a coat weight from 1.0 to 50.0 g/m$^2$.

19. The rotogravure printing medium according to claim 1, wherein the coating layer has a coat weight from 2.0 to 40.0 g/m$^2$.

20. The rotogravure printing medium according to claim 1, wherein the coating layer has a coat weight from 3.0 to 30.0 g/m².

21. The rotogravure printing medium according to claim 1, wherein the coating layer has a coat weight from 5.0 to 20.0 g/m².

22. The rotogravure printing medium according to claim 1, wherein the rotogravure printing medium consists of the substrate and the coating layer being in contact with at least the first side of the substrate.

23. A coating composition for a rotogravure printing medium, the composition consisting of:
  a) >50.0 to 100.0 parts by weight of at least one natural source of calcium carbonate comprising particles consisting of calcium carbonate in an amount of >50.0 wt %, based on the total dry weight of the natural source of calcium carbonate, the at least one natural source of calcium carbonate comprises particles having a BET specific surface area of from 4.0 to 12.0 m²/g, measured by the BET nitrogen method, wherein the at least one natural source of calcium carbonate is in the form of crumbles comprising dolomite and/or at least one natural ground calcium carbonate (NGCC),
  b) 0.0 to <50.0 parts by weight of at least one further pigment suitable for papermaking,
  c) 3.0 to 6.0 parts by weight of at least one synthetic binder,
  d) 0.1 to 0.5 parts by weight of at least one stearate salt,
  e) at least one aqueous solvent,
  f) optionally 1.0 to 1.5 parts by weight of at least one polysaccharide,
  g) optionally 0.1 to 0.5 parts by weight of at least one thickener,
  h) optionally 0.2 to 3.0 parts by weight of at least one dispersing agent, wherein the sum of the at least one natural source of calcium carbonate and the at least one further pigment in the coating composition is 100.0 parts by weight, and
  i) at least one further pigment in the coating layer is 100.0 parts by weight;
  wherein the crumbles are a material being composed of a plurality of particles comprising the at least one source of calcium carbonate and moisture, said crumbles obtained by a process comprising the following steps:
    a) providing at least one calcium carbonate-containing material in the form of an aqueous slurry having solids content in the range from 5.0 to 45.0 wt.-%, based on the total weight of the slurry,
    b) wet grinding the at least one calcium carbonate-containing material of step a) to obtain an aqueous slurry of at least one wet-ground calcium carbonate containing material, wherein the particles of the at least one wet-ground calcium carbonate-containing material have a
      i) weight particle size $d_{75}$ of 0.7 to 3.0 μm,
      ii) weight median particle size $d_{50}$ of 0.5 to 2.0 μm,
      iii) weight particle size $d_{25}$ of 0.1 to 1.0 μm, as measured according to the sedimentation method, and
      iv) a BET specific surface area of from 4.0 to 12.0 m²/g, measured by the measured by nitrogen gas adsorption using the BET isotherm (ISO 9277: 2010),
    c) mechanical dewatering of the aqueous slurry of step b) to obtain crumbles comprising the at least one calcium carbonate-containing material having solids content of 78.0 wt.-% to 90.0 wt.-%, based on the total weight of the crumbles.

24. The coating composition according to claim 23, wherein the coating composition has a solid content from 10.0 to 80.0 wt.-%, based on the total weight of the coating composition.

25. The coating composition according to claim 23, wherein the coating composition has a solid content from 30.0 to 75.0 wt.-%, based on the total weight of the coating composition.

26. The coating composition according to claim 23, wherein the coating composition has a solid content from 40.0 to 70.0 wt.-%, based on the total weight of the coating composition.

27. The coating composition according to claim 23, wherein the coating composition has a solid content from 45.0 to 65.0 wt.-%, based on the total weight of the coating composition.

28. A method for producing a rotogravure printing medium comprising the steps of:
  a) providing a substrate having a first side and a reverse side, and
  b) applying the coating composition of claim 23 on at least the first side of the substrate to form a coating layer.

29. The method according to claim 28, wherein the method further comprises step c) of drying the coating layer.

30. The method according to claim 28, wherein the coating composition is applied by high speed coating, metering size press, curtain coating, spray coating, or electrostatic coating.

31. The method according to claim 28, wherein the coating composition is applied by high speed coating.

32. A coating composition for a rotogravure printing medium according to claim 23, wherein the crumbles have solids content of 80.0 wt.-% to 88.0 wt.-%, based on the total weight of the crumbles.

33. A coating composition for a rotogravure printing medium according to claim 23, wherein the at least one natural source of calcium carbonate comprises particles having a top cut of less than 2.5 μm.

* * * * *